US012192621B2

(12) United States Patent
Young et al.

(10) Patent No.: US 12,192,621 B2
(45) Date of Patent: Jan. 7, 2025

(54) SMART MODE SWITCHING ON UNDERWATER SENSOR SYSTEM

(71) Applicant: TidalX AI Inc., San Ramon, CA (US)

(72) Inventors: Grace Calvert Young, Mountain View, CA (US); Nupur Garg, Cupertino, CA (US)

(73) Assignee: TidalX AI Inc., Mountain View, CA (US)

( * ) Notice: Subject to any disclaimer, the term of this patent is extended or adjusted under 35 U.S.C. 154(b) by 0 days.

(21) Appl. No.: 17/833,278

(22) Filed: Jun. 6, 2022

(65) Prior Publication Data

US 2023/0396878 A1 Dec. 7, 2023

(51) Int. Cl.
*H04N 23/667* (2023.01)
*H04N 7/18* (2006.01)
*H04N 23/61* (2023.01)
*H04N 23/66* (2023.01)

(52) U.S. Cl.
CPC ............. *H04N 23/667* (2023.01); *H04N 7/18* (2013.01); *H04N 23/61* (2023.01); *H04N 23/66* (2023.01)

(58) Field of Classification Search
CPC ....... H04N 23/667; H04N 23/61; H04N 23/66
USPC .................................................. 348/211.99
See application file for complete search history.

(56) References Cited

U.S. PATENT DOCUMENTS

| 8,009,516 | B2 | 8/2011 | Crowell |
| 10,331,136 | B2 | 6/2019 | Perrone |
| 10,338,195 | B2 | 7/2019 | Stokes et al. |
| 10,578,074 | B2 | 3/2020 | Magnell |
| 2011/0058085 | A1* | 3/2011 | Ito .......... H04N 23/667 348/E5.022 |
| 2020/0107524 | A1* | 4/2020 | Messana ...... A01K 29/005 |

FOREIGN PATENT DOCUMENTS

WO   WO 2021/236214    11/2021

OTHER PUBLICATIONS

International Search Report and Written Opinion in International Appln. No. PCT/US2023/021125, dated Aug. 30, 2023, 14 pages.

* cited by examiner

*Primary Examiner* — Joel W Fosselman
(74) *Attorney, Agent, or Firm* — Fish & Richardson P.C.

(57) ABSTRACT

Methods, systems, and apparatus, including computer programs encoded on computer storage media, for setting modes for an underwater camera. In some implementations, a scheduler repeatedly: obtains data of a current context of an underwater camera; determines whether the current context satisfies first criteria associated with continued activation of one or more modes that are currently activated and satisfies second criteria associated with activation of one or more modes that are not currently activated; selects modes to be active based on (i) determining whether the current context satisfies the first criteria and (ii) determining whether the current context satisfies the second criteria; and activating any of the modes that are to be active and that are not currently activated, or deactivating any of the modes that are currently activated that are not included in the one or more modes that are to be activated.

19 Claims, 7 Drawing Sheets

Default Mode Schedule

| Hours / Days | Day 1 | Day 2 | Day 3 | Day 4 | Day 5 | Day 6 | Day 7 |
|---|---|---|---|---|---|---|---|
| 0-2 | Mode 1 | Mode 1 | Mode 1 | Mode 1 | Mode 1 | Mode 1 | Mode 1 |
| 2-4 | Mode 1 | Mode 1 | Mode 1 | Mode 1 | Mode 1 | Mode 1 | Mode 1 |
| 4-6 | Mode 1 | Mode 1 | Mode 1 | Mode 1 | Mode 1 | Mode 1 | Mode 1 |
| 6-8 | Mode 2 | Mode 2 | Mode 2 | Mode 2 | Mode 2 | Mode 1 | Mode 2 |
| 8-10 | Mode 3 | Mode 3 | Mode 3 | Mode 3 | Mode 3 | Mode 5 | Mode 3 |
| 10-12 | Mode 2 | Mode 2 | Mode 2 | Mode 2 | Mode 2 | Mode 2 | Mode 2 |
| 12-14 | Mode 3 | Mode 3 | Mode 3 | Mode 3 | Mode 3 | Mode 3 | Mode 3 |
| 14-16 | Mode 2 | Mode 2 | Mode 2 | Mode 2 | Mode 2 | Mode 2 | Mode 2 |
| 16-18 | Mode 4 | Mode 4 | Mode 4 | Mode 4 | Mode 4 | Mode 4 | Mode 4 |
| 18-20 | Mode 1 | Mode 1 | Mode 1 | Mode 1 | Mode 1 | Mode 1 | Mode 1 |
| 20-22 | Mode 1 | Mode 1 | Mode 1 | Mode 1 | Mode 1 | Mode 1 | Mode 1 |
| 22-24 | Mode 1 | Mode 1 | Mode 1 | Mode 1 | Mode 1 | Mode 1 | Mode 1 |

200

FIG. 2A

Modes Selected By Smart Scheduler

| Hours / Days | Day 1 | Day 2 | Day 3 | Day 4 | Day 5 | Day 6 | Day 7 |
|---|---|---|---|---|---|---|---|
| 0-2 | | | | | | | |
| 2-4 | | | | | | | |
| 4-6 | Mode 1 | Mode 1 | | | | Mode 1 | |
| 6-8 | | Mode 2 | Mode 1 | Mode 1 | Mode 1 | Mode 5 | Mode 1 |
| 8-10 | Mode 3 | Mode 3 | Mode 2 | Mode 2 | Mode 2 | | |
| 10-12 | Mode 1 | Mode 2 | Mode 3 | Mode 3 | Mode 3 | Mode 3 | Mode 2 |
| 12-14 | Mode 3 | Mode 3 | Mode 2 | Mode 2 | Mode 2 | Mode 2 | Mode 3 |
| 14-16 | Mode 4 | Mode 2 | Mode 3 | Mode 3 | Mode 3 | Mode 3 | Mode 2 / Mode 5 |
| 16-18 | | | Mode 4 | Mode 4 | Mode 4 | Mode 4 | Mode 3 |
| 18-20 | Mode 2 | Mode 1 | Mode 2 | Mode 2 | Mode 2 | Mode 2 | Mode 2 / Mode 4 |
| 20-22 | Mode 1 | | Mode 1 | Mode 1 | Mode 1 | Mode 1 | Mode 1 |
| 22-24 | | | | | | | |

300

```
┌─────────────────────────────────────────────────────────────────────────────┐
│ Repeatedly, by a scheduler of an underwater camera: obtaining data indicative of a current context of │
│                         an underwater camera                                                          │
│                                                                          302                          │
└─────────────────────────────────────────────────────────────────────────────┘
                                       ↓
┌─────────────────────────────────────────────────────────────────────────────┐
│ Determining whether the current context of the underwater camera satisfies one or more first criteria │
│ associated with the continued activation of one or more modes that are currently activated on the     │
│                         underwater camera                                                             │
│                                                                          304                          │
└─────────────────────────────────────────────────────────────────────────────┘
                                       ↓
┌─────────────────────────────────────────────────────────────────────────────┐
│ Determining whether the current context of the underwater camera satisfies one or more second         │
│ criteria associated with activation of one or more modes that are not currently activated on the      │
│                         underwater camera                                                             │
│                                                                          306                          │
└─────────────────────────────────────────────────────────────────────────────┘
                                       ↓
┌─────────────────────────────────────────────────────────────────────────────┐
│ Selecting one or more modes to be active based on (i) determining whether the current context of the  │
│ underwater camera satisfies the one or more first criteria and (ii) determining whether the current   │
│ context of the underwater camera satisfies the one or more second criteria      308                   │
└─────────────────────────────────────────────────────────────────────────────┘
                                       ↓
┌─────────────────────────────────────────────────────────────────────────────┐
│ Causing the one or more modes to be active on the underwater camera, comprising:                      │
│                                                                          310                          │
└─────────────────────────────────────────────────────────────────────────────┘
                                       ↓
┌─────────────────────────────────────────────────────────────────────────────┐
│ Activating any of the one or more modes that are to be active and that are not currently activated on │
│                         the underwater camera                                                         │
│                                                                          312                          │
└─────────────────────────────────────────────────────────────────────────────┘
                                       ↓
┌─────────────────────────────────────────────────────────────────────────────┐
│ Deactivating any of the one or more modes that are currently activated on the underwater camera       │
│ that are not included in the one or more modes that are to be activated.        314                   │
└─────────────────────────────────────────────────────────────────────────────┘
```

FIG. 3

SMART MODE SWITCHING ON UNDERWATER SENSOR SYSTEM

TECHNICAL FIELD

This specification generally relates to an automated camera controller for aquaculture systems, and specifically, setting one or more modes for the automated camera controller.

BACKGROUND

Aquaculture involves the farming of aquatic organisms, such as fish, crustaceans, or aquatic plants. In aquaculture, and in contrast to commercial fishing, freshwater and saltwater fish populations are cultivated in controlled environments. For example, the farming of fish can involve raising fish in tanks, fishponds, or ocean enclosures.

SUMMARY

The techniques described in this specification relate to determining one or more modes for operation of an underwater camera. An underwater camera system in an aquaculture environment can perform a variety of tasks. For example, these tasks can relate to performing biomass estimation of aquaculture livestock, disease detection of aquaculture, fish feeding detection and decision-making support, net inspection of the enclosure, aquaculture identification, data transferring, processing of backlogged data, among others. However, the underwater camera system is faced with computational constraints when submerged underwater and when determining which mode to operate. For example, some difficulty may exist with supplying power consistently to the camera underwater system, making memory available on the underwater camera system, communicating when disrupted by the water when attempting to transmit data to and from the underwater camera system, and operating under various water temperatures and sea states. Based on these constraints and others, the underwater camera system may not be able to operate each of the modes in a parallel manner. To compensate, the underwater camera system can rely on a scheduler that can intelligently decide which of the one or more modes to operate the underwater camera system, when, and for how long.

In some implementations, the scheduler can monitor internal and external resources to determine which modes to run. The scheduler can initially select one or more modes to operate the underwater camera system. Then, the scheduler can monitor various resources to determine whether the initially selected modes are the correct modes to run. If the scheduler determines that the currently running modes are not the correct modes to run, the scheduler can cease the operation of the current modes and execute the operation of the correct modes to run. Similarly, if the scheduler determines that the currently running modes are the correct modes to run, then the scheduler can continuously monitor the various resources for identifying the correct modes for potentially switching.

In some implementations, the scheduler can be trained to perform mode selection in a continuous and iterative manner. For example, after selecting one or modes for the underwater camera system to run, the scheduler can monitor the internal and external resources of the underwater camera system in a continuous manner to determine whether the operation of the underwater camera system is better suited for the same or different modes. The scheduler may continuously poll various data resources to retrieve data regarding the environment of the underwater camera system. In response, the scheduler can determine whether the current modes of the underwater camera system are the desired modes to run based on its environment. By operating in a manner that continuously monitors resources related to the underwater camera system, a human operator can be removed from controlling the underwater camera system. Similarly, the underwater camera system can operate based on the status of the environment, which can change rapidly based on temperature of the environment, aquaculture livestock present, time of day, and other factors, as will be outlined below.

In some implementations, the scheduler can set one or more modes of the underwater camera system. A mode can be defined as a process that the underwater camera system executes to accomplish a given goal or a set of goals. In some cases, modes can be hardware dependent or limited-hardware dependent. The hardware dependent modes can rely on various hardware components external to the underwater camera system, such as a winch system with pulleys, a feeder system, external data storage, and/or a lights system, as will be further described below. The limited-hardware dependent modes can run concurrently with other modes because it does not monopolize external hardware dependencies. For example, the hardware dependent modes can include sea lice detection of aquaculture livestock, biomass detection of aquaculture, and feeding decision making of aquaculture livestock, among others. The limited-hardware dependent modes can include net inspection of the enclosure and decision making regarding whether to record aquaculture livestock. Other examples are also possible, and will be described below.

In one general aspect, a method is performed by a server. The method includes: repeatedly, by a scheduler of an underwater camera: obtaining data indicative of a current context of an underwater camera; determining whether the current context of the underwater camera satisfies one or more first criteria associated with continued activation of one or more modes that are currently activated on the underwater camera; determining whether the current context of the underwater camera satisfies one or more second criteria associated with activation of one or more modes that are not currently activated on the underwater camera; selecting one or more modes to be active based on (i) determining whether the current context of the underwater camera satisfies the one or more first criteria and (ii) determining whether the current context of the underwater camera satisfies the one or more second criteria; and causing the one or more modes to be active on the underwater camera, comprising: activating any of the one or more modes that are to be active and that are not currently activated on the underwater camera, or deactivating any of the one or more modes that are currently activated on the underwater camera that are not included in the one or more modes that are to be activated.

Other embodiments of this and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The foregoing and other embodiments can each optionally include one or more of the following features, alone or in combination. For example, one embodiment includes all the following features in combination.

In some implementations, the method includes wherein obtaining the data indicative of the current context of the underwater camera further comprises: obtaining data indicative of ambient light; obtaining data indicative of power availability; obtaining power availability of the underwater camera; obtaining data indicative of connectivity between the underwater camera and a remote server; obtaining data indicative of foreign fish presence in a fish pen that is proximate to a location of the underwater camera; obtaining data indicative of opportunities for disease treatment of one or more fish being monitored; obtaining data indicative of harvest schedules for harvesting the fish; obtaining data indicative of research priorities; obtaining data indicative of one or more of diseases and environmental factors of one or more other nearby fish farms; obtaining data indicative of results of one or more other modes currently run on the underwater camera; obtaining data indicative of fish distribution in the fish pen; and obtaining data indicative of hardware status or maintenance associated with the underwater camera.

In some implementations, the method includes wherein determining whether the current context of the underwater camera satisfies the one or more first criteria associated with continued activation of the one or more modes that are currently activated on the underwater camera further comprises: identifying the one or more first criteria associated with the one or more modes that are currently activated that defines whether the underwater camera should activate the one or more modes; analyzing one or more of the data indicative of ambient light, the data indicative of power availability, the power availability of the underwater camera, the data indicative of connectivity, the data indicative of foreign fish presence, the data indicative of opportunities for disease treatment, the data indicative of harvest schedules, the data indicative of research priorities, the data indicative of one or more of diseases and environmental factors, the data indicative of results of one or more other modes, the data indicative of fish distribution in the fish pen, and the data indicative of hardware status or maintenance associated with the underwater camera, against the first criteria corresponding to each of the one or more modes currently active of the underwater camera; in response to analyzing the data indicative of the current context of the underwater camera against the one or more first criteria of the currently active modes, determining a likelihood for each mode of the one or more modes that indicates whether the one or more modes should be active; comparing the likelihood for each mode of the one or more modes to a threshold value; and in response to determining that a first subset of one or more modes that are currently active satisfies the threshold value, determining the first subset of the one or more modes are to continue being active; or in response to determining that a second subset of one or more modes that are currently active do not satisfy the threshold value, determining the second subset of the one or more modes are to be inactive.

In some implementations, the method includes wherein determining whether the current context of the underwater camera satisfies the one or more second criteria associated with activation of the one or more modes that are not currently activated on the underwater camera further comprises: identifying the one or more second criteria associated with the one or more modes that are currently inactive that defines whether the underwater camera should activate the one or more modes; analyzing one or more of the data indicative of ambient light, the data indicative of power availability, the power availability of the underwater camera, the data indicative of connectivity, the data indicative of foreign fish presence, the data indicative of opportunities for disease treatment, the data indicative of harvest schedules, the data indicative of research priorities, the data indicative of one or more of diseases and environmental factors, the data indicative of results of one or more other modes, the data indicative of fish distribution in the fish pen, and the data indicative of hardware status or maintenance associated with the underwater camera, against the second criteria corresponding to each of the one or more modes currently inactive of the underwater camera; in response to analyzing the data indicative of the current context of the underwater camera against the one or more second criteria of the one or more modes currently inactive, determining a likelihood for each mode of the one or more modes that are currently inactive that indicates whether the one or more modes should be active; comparing the likelihood for each mode of the one or more modes to a threshold value; and in response to determining that a third subset of one or more modes that are currently inactive satisfies the threshold value, determining the third subset of the one or more modes are to be active; or in response to determining that a fourth subset of one or more modes that are currently inactive do not satisfy the threshold value, determining the fourth subset of the one or more modes are to remain inactive.

In some implementations, the method includes wherein selecting the one or more modes to be active based on (i) determining whether the current context of the underwater camera satisfies the one or more first criteria and (ii) determining whether the current context of the underwater camera satisfies the one or more second criteria further comprises: identifying the first subset of the one or more modes that are currently active to continue being active on the underwater camera; or identifying the second subset of the one or more modes that are currently active to transition to being inactive.

In some implementations, the method includes wherein selecting the one or more modes to be active based on (i) determining whether the current context of the underwater camera satisfies the one or more first criteria and (ii) determining whether the current context of the underwater camera satisfies the one or more second criteria further comprises: identifying the third subset of the one or more modes that are currently inactive to transition to being active; or identifying the fourth subset of the one or more modes that are currently inactive to continue being inactive.

In some implementations, the method includes wherein activating any of the one or more modes that are to be active and that are not currently activated on the underwater camera further comprises: activating the third subset of the one or more modes that are currently inactive on the underwater camera; and maintaining activation of the first subset of the one or more modes that are currently active on the underwater camera.

In some implementations, the method includes wherein deactivating any of the one or more modes that are currently activated on the underwater camera that are not included in the one or more modes that are to be activated further comprises: deactivating the second subset of the one or more modes that are currently active on the underwater camera; and maintaining inactivation of the fourth subset of the one or more modes that are currently inactive.

In some implementations, the method includes assigning one or more goals to each of the one or more modes, wherein each goal of the one or more goals include one or more criteria that define tasks for the underwater camera to complete when the one or more modes are active.

In some implementations, the method includes: monitoring a completion amount of each goal of the one or more goals corresponding to the one or more modes that are currently active on the underwater camera; comparing the completion amount of each goal of the one or more goals to a threshold value; and in response to determining a subset of modes of the one or more modes satisfies the threshold value, determining that the subset of modes can be switched to inactive based on a completion of the subset modes for reaching their respective goals; or in response to determining a subset of modes of the one or more modes does not satisfy the threshold value, determining that the subset of modes continue to be active on the underwater camera while performing tasks for reaching their respective goals.

In some implementations, the method includes wherein the one or more modes comprises hardware modes and modes that require limited-hardware, the hardware modes comprising sea lice detection, biomass detection, and feeding decision making, and the modes that require limited-hardware comprising net inspection and recording decision making.

In some implementations, the method includes wherein one or more of the modes that require limited-hardware can run on the underwater camera as a background process and one mode of the hardware modes can run on the underwater camera at a time.

The subject matter described in this specification can be implemented in various embodiments and may result in one or more of the following advantages. In particular, the system can ensure the optimal mode or modes of the underwater camera system are operating based on a state of the underwater camera system and its external environment. For example, the scheduler can determine based on a remote location of the underwater camera system that a power supply may be unavailable or intermittent. As such, the scheduler can ensure that the underwater camera system operates with modes that require low or small power constraints to extend battery usage. Similarly, when in a remote location, the scheduler can determine that the underwater camera system is not able to communicate with the remote server. In this manner, the scheduler can ensure that the underwater camera system operates in one or more modes that are to be successful without communicating with the remote server. Other examples are also possible. The scheduler can monitor can various resources associated with the underwater camera system and ensure the underwater camera system is successful in operating modes to meet the respective goals and maximize available compute resources.

In some implementations, the scheduler can be trained to forecast one or more modes for underwater camera system operation. Specifically, the scheduler can set one or more modes for the underwater camera system to operate in the future, e.g., one day, one week, one month, etc., based on various resources. The scheduler can implement a detailed schedule that describes one or more modes for the underwater camera system to operate in the future. The detailed schedule can include, for example, the one or more modes to operate, a starting time for the one or more modes, a duration of the underwater camera system's mode operation, and an indication of one or more modes executing in parallel. Similarly, the scheduler can adjust the detailed schedule in real time based on a status of the underwater camera system, data indicative of internal resources, and data indicative of external resources. In this manner, the scheduler can implement a schedule for the underwater camera system and can adjust the schedule for the underwater camera system to ensure that the underwater camera system is successful in achieving the goals set by the one or more modes of operation.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2A is a diagram that illustrates an example of a schedule for camera operating modes.

FIG. 3 is a flow diagram that illustrates an example of a process for selecting a mode for a camera to operate when observing aquaculture.

Like reference numbers and designations in the various drawings indicate like elements. The components shown here, their connections and relationships, and their functions, are meant to be examples only, and are not meant to limit the implementations described and/or claimed in this document.

DETAILED DESCRIPTION

Figure 1A:
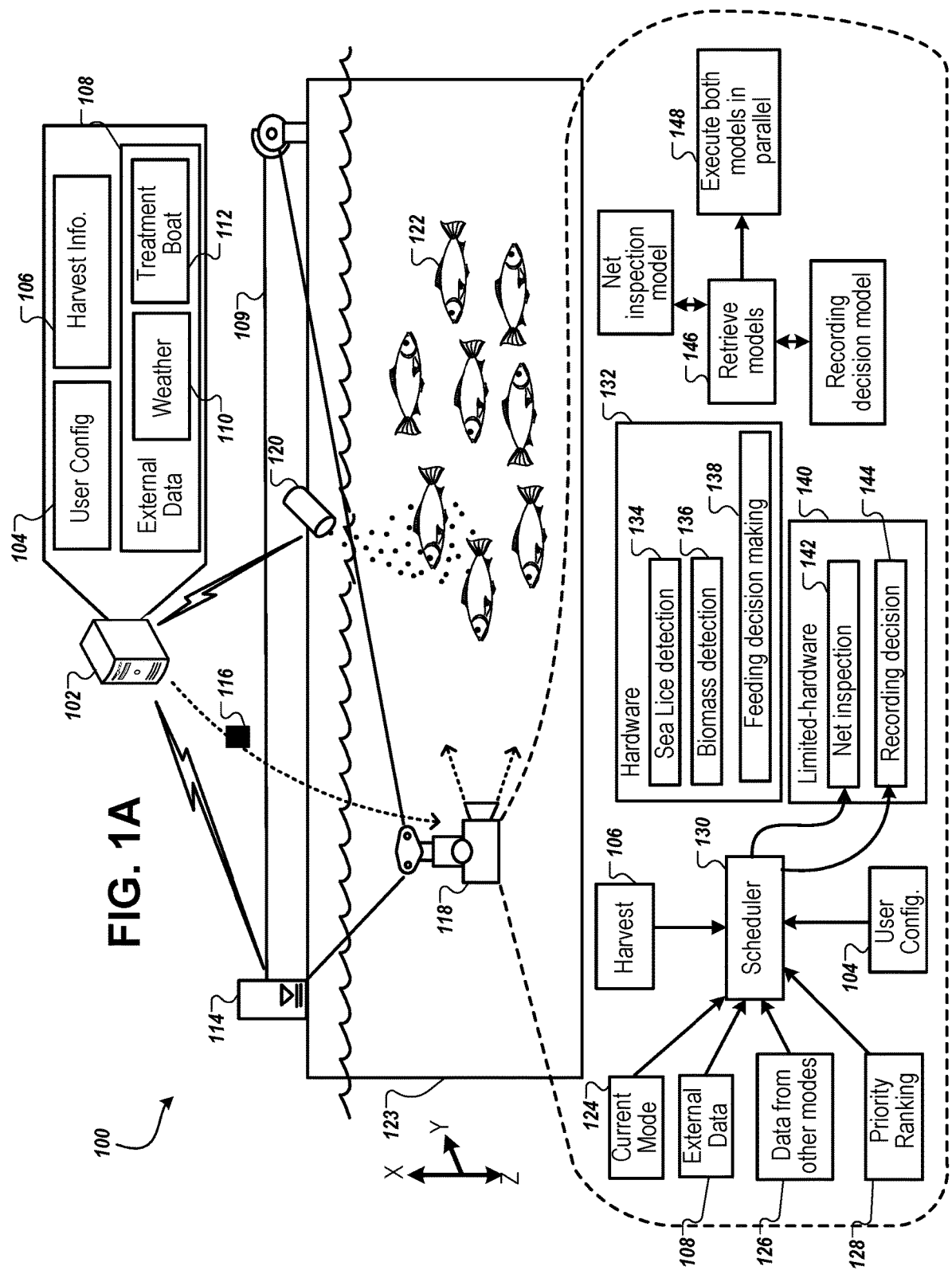
FIG. 1A is a diagram of an example smart mode selection system and an enclosure that contains aquatic livestock.

FIG. 1A is a diagram of an example smart mode selection system 100 and an enclosure that contains aquatic livestock. A Cartesian coordinate is provided in system 100 for ease of reference. Although FIG. 1A illustrates the enclosure 123 extending in the XY-plane, the enclosure 123 further extends in the Z-direction, with the positive Z-direction out of the page of the drawing.

In some implementations, the aquatic livestock can be various creatures that swim freely within the confines of the enclosure 123. Specifically, the aquatic livestock, such as aquatic livestock 122, stored within the enclosure 123 can include finfish or other types of aquatic lifeforms. The aquatic livestock 122 can include, for example, juvenile fish, koi fish, salmon, and bass, to name a few examples. The aquatic livestock 122 can also include aquatic plants or other species.

In addition to the aquatic livestock, the enclosure 123 contains water, e.g., seawater, freshwater, and/or rainwater, although the enclosure can contain any fluid that is capable of sustaining a habitable environment for the aquatic livestock. The smart mode selection system 100 includes a camera subsystem 118, a remote server 102, a winch subsystem 114, a lighting subsystem, and a feeder 120.

In some implementations, the smart mode selection system 100 can be used to select one or more modes for the camera subsystem 118 for operating. For example, the system 100 may be used to determine whether the camera subsystem 118 should perform feeding in a feeding decision making mode. In the feeding decision making mode, the smart mode selection system 100 can be used to determine where, how much, and for how long the aquatic livestock are to be feeding within the enclosure 123. Generally, the smart mode selection system 100 can determine a position for where the camera subsystem 118 should be located in this mode.

In another example, the system 100 may be used to determine whether the camera subsystem 118 should be operating in the sea lice detection mode. In the sea lice detection mode, the camera subsystem 118 should be close enough to the aquatic livestock such that the camera subsystem 118 can view the lice on each fish of the aquatic livestock but not too close that multiple fish cannot be seen in the field of view of the camera subsystem 118. In this manner, depending on the mode of the camera subsystem 118, the camera subsystem 118's characteristics can be appropriately tuned.

In some implementations, the smart mode selection system 100 can adjust a mode of the camera subsystem 118 based on a current feeding behavior of the aquatic livestock. For example, the smart mode selection system 100 can determine that the aquatic livestock 122 are no longer eating the feed and, in response, adjust a mode from the feeding decision making to another mode, such as the sea lice detection mode. In some examples, the smart mode selection system 100 may determine that the aquatic livestock 122 are eating the feed but a portion of the feed is not being eaten by the fish and, in response, reduce a rate that the feed is being provided to the fish.

In some implementations, the smart mode selection system 100 can include a remote server 102 that can communicate with the camera subsystem 118. Specifically, the remote server 102 can include one or more computers or servers connected locally or over a network. The remote server 102 can communicate with the camera subsystem 118 via Wi-Fi, Bluetooth, Cellular, and/or the Internet, to name a few examples. As illustrated in system 100, the remote server 102 can include a user configuration 104, harvest information 106, and external data 108.

The user configuration 104 can include information relating to the configuration of the winch subsystem 114, the camera subsystem 118, the lighting subsystem, and the feeder 120. The user configuration 104 could also include target goals for each mode or the relative importance of modes. Additionally, the user configuration 104 can include information related to prior settings of the components within the smart mode selection system 100. For example, the user configuration 104 can include a current position of the camera subsystem 118, prior locational coordinates, and future locational coordinates for the camera subsystem 118. Additionally, the remote server 102 can generate instructions that correspond to a position to which the camera subsystem 118 should be moved based on the data within the user configuration 104. For example, the remote server 102 can generate an instruction corresponding to an X, Y, and Z-coordinate within the enclosure 123 for the camera subsystem 118. Moreover, the instruction can also correspond to a rotation about an axis of rotation of the smart mode selection system 100, the axis of rotation changing a horizontal angle of the camera subsystem 118, the horizontal angle being an angle within the XZ-plane at which the camera subsystem 118 receives sensor input. The instruction can also correspond to a rotation about a pin that connects the camera subsystem 118 to components of the winch subsystem 114. Such a rotation changes a vertical angle of the camera subsystem 118, the vertical angle being measured with respect to the positive Y-axis. The instruction can describe a possible position, horizontal angle, and vertical angle of the camera subsystem 118 within the enclosure 123.

In some implementations, the remote server 102 can be communicatively coupled to a computer that can present sensor data captured by the camera subsystem 118 to a reviewer of the aquatic livestock who can observe the aquatic livestock 122 and the enclosure 123. The remote server 102 can communicate instructions provided by the reviewer to the winch subsystem 114. Specifically, the reviewer can provide instructions related to one or more modes to set the camera subsystem 118, one or more positions for the camera subsystem 118 within the enclosure 123, instructions for adjusting the winch subsystem 114, instructions for adjusting the lighting subsystem of the system 100, and other instructions.

In some implementations, the smart mode selection system 100 can include a winch subsystem 114. The winch subsystem 114 can receive instructions from the remote server 102 and activate one or more motors to move the camera subsystem 118 to a position represented by the instructions, e.g., an X, Y, Z-coordinate position. The winch subsystem 114 can include one or more motors, one or more power supplies, and one or more pulleys to which a cord 109, which suspends the camera subsystem 118, is attached. A pulley is a machine used to support movement and direction of a cord, such as cord 109. Although the winch subsystem 114 includes a single cord 109, any configuration of one or more cords and one or more pulleys that allows the camera subsystem 118 to move and rotate, as described herein, can be used.

In some implementations, the winch subsystem 114 can receive an instruction from the remote server 102 and activate the one or more motors to move the cord 109. The cord 109, and the attached camera subsystem 118, can be moved along the X, Y, and Z-directions, to a position corresponding to the instruction. Additionally, the remote server 102 can provide an instruction to the camera subsystem 118 to set the various settings associated with the camera subsystem 118. For example, the instruction can indicate one or modes for the scheduler 130 of the camera subsystem 118 to operate, a specified focal length of the camera subsystem 118, a specified resolution of the camera subsystem 118, and a lighting setting of the camera subsystem 118. Other settings are also possible.

A motor of the winch subsystem 114 can be used to rotate the camera subsystem 118 to adjust the horizontal angle and the vertical angle of the camera subsystem 118. A power supply can power the individual components of the winch subsystem 114. The power supply can provide AC and DC power to each of the components at varying voltage and current levels. In some implementations, the winch subsystem 114 can include multiple winches or motors to allow motion in the X, Y, and Z-directions.

In some implementations, the camera subsystem 118 can include one or more sensors that can monitor the aquatic livestock in the enclosure 123. The camera subsystem 118 may be waterproof and can withstand the effects of external forces, such as typical ocean currents, without breaking and withstand the effects of various environmental conditions, such as cold water and salt. The camera subsystem 118 can include one or more sensors that acquire sensor data, e.g., images and video footage, thermal imaging, heat signatures, according to the type of sensor of the camera subsystem. For example, the camera subsystem 118 can include one or more of the following sensors: a camera, an IR sensor, a UV sensor, a heat sensor, a pressure sensor, a hydrophone, a water current sensor, or a water quality sensor such as one that detects oxygen saturation, water salinity, or an amount of a dissolved solid.

In some implementations, the camera subsystem 118 can include a mobile device. The mobile device can include, for example, a smart phone, a tablet, a portable computer, a handheld device, or another related device. The mobile device can be configured to monitor the aquatic livestock in the enclosure 123. The mobile device can be connected to the winch subsystem and move within the enclosure 123. Moreover, the mobile device can be configured in a harness to withstand the effects of various environmental conditions. Moreover, the mobile device can be configured to communicate with the remote server 102 as well as other client devices for communicating sensor data, instructions, status information, and other information. Moreover, the camera subsystem 118 can include multiple mobile devices configured to perform different functions for monitoring the aquatic livestock in the enclosure 123.

In some implementations, the smart mode selection system 100 can include a lighting subsystem. The lighting subsystem can include one or more lights attached to the camera subsystem 118 that can improve the visibility of the camera subsystem 118. In some implementations, the lighting subsystem can be attached to one or more portions of the enclosure 123. The remote server 102 can configure the lighting subsystem to be on, off, or set to a desired brightness. As will be further described below, the lighting subsystem can be set to a desired brightness based on the mode being executed by the camera subsystem 118.

The smart mode selection system 100 can store sensor data captured by the camera subsystem 118 in sensor data storage. In some implementations, the system 100 can store media, such as video and images, as well as sensor data, such as ultrasound data, thermal data, and pressure data, to name a few examples. Additionally, the sensor can include GPS information corresponding to a geolocation at which the camera subsystem 118 captured the sensor data.

In some implementations, the camera subsystem 118 and the winch subsystem 114 can include inertial measurement devices for tracking motion and determining position of the camera subsystem 118. Specifically, the camera subsystem 118 and the winch subsystem 114 may include accelerometers, gyroscopes, and magnetometers, to name a few examples. Additionally, the winch subsystem 114 can also keep track of the amount of cord 109 that has been spooled out and/or reeled in, to provide another input for estimating the position of the camera subsystem 118. In some implementations, the winch subsystem 114 can also provide torques applied to the cord, to provide input on the position and status of the camera subsystem 118. In some implementations, the camera subsystem 1118 can be attached to an autonomous underwater vehicle (AUV), e.g., a tethered AUV.

In some implementations, the camera subsystem 118 can include a scheduler 130. The scheduler 130 can include one or more software components that are configured to determine a mode for the camera subsystem 118. A mode can be a process that the camera subsystem 118 executes to accomplish a given goal or a set of goals. For example, the modes of the smart mode selection system 100 can include a biomass estimation mode, a disease detection mode, a fish feeding detection mode, a net inspection mode, a sea lice detection mode, a recording decision mode, a calibration mode, a simulation mode, a data transfer mode, a data-processing mode, a human-intervention mode, and a debugging mode, to name some examples.

The smart mode selection system 100 can divide the modes into two separate categories. The two separate categories can include hardware dependent modes and limited-hardware dependent modes. The hardware dependent modes can require all external hardware resources, a subset of external hardware resources, or one external hardware resource such as one or more of the winch subsystem 114, the lighting components, and the pulley, for example. Hardware dependent modes may not run concurrently with other modes requiring the same hardware. The limited-hardware dependent modes can utilize the camera or sensor subsystem 118 itself without relying on additional various hardware components. The limited-hardware dependent modes can run concurrently with other modes. For example, the hardware dependent modes can include sea lice detection of aquaculture livestock, biomass detection of aquaculture, feeding decision making of aquaculture livestock, calibration mode, simulation mode, and a debugging mode, among others. The limited-hardware dependent modes can include net inspection of the enclosure and decision making regarding whether to record aquaculture livestock. Other potential categories are also possible.

In some implementations, the scheduler 130 can determine which mode or modes to execute on the camera subsystem 118 during a period of time. In some cases, only one hardware dependent mode can execute on the camera subsystem 118 due to hardware constraints required by the mode. Alternatively, the limited-hardware dependent modes can run in the background of the camera subsystem 118 and multiple limited-hardware dependent modes can run at a time. As such, the scheduler 130 can set the camera subsystem 118 to perform a variety of modes and relay information related to the modes to the remote server 102. For example, as previously mentioned, the camera subsystem 118 can perform biomass estimation, disease detection, fish feeding detection, and net hole detection, among other modes. However, computational constraints exist for operating the camera subsystem 118 that is fully submerged under water. For example, computational constraints can include a difficulty associated with consistently supplying power to the camera subsystem 118, a difficulty associated with transmitting data to the camera subsystem 118 and receiving data from the camera subsystem 118, and a rigidness of the camera subsystem 118 to operate under various temperature, external forces, and sea states. As such, the smart mode selection system 100 may desire executing these modes on the camera subsystem 118 at different times to handle the constraints due to external and internal factors.

Each mode of the camera subsystem 118 can be defined by one or more goals. A goal of the mode can represent a result to be met by performing the mode. For example, for the mode of sea lice detection, one goal can include defining a ratio of lice per fish for one hundred fish. Then, the camera subsystem 118 can execute the mode of sea lice detection until a ratio has been defined for 100 fish. In another example, for the mode of net inspection, the camera subsystem 118 can execute inspecting the net of enclosure 123 for holes until the entirety of the enclosure 123 has been inspected. During the net inspection mode, the camera subsystem 118 can rely on the camera's video feed for monitoring the net of the enclosure 123 and not the camera's exposure. The camera subsystem 118 can operate a mode until a desired goal has been met or until the scheduler 130 determines another mode should be run based on a current state of the smart mode selection system 100.

The biomass estimation mode can include a goal for estimating the biomass of a fish. For example, a goal can represent estimating biomass, e.g., weight or size, for one hundred fish identified in the enclosure 123. The disease detection mode can include a goal for identifying a disease associated with the fish. For example, a goal can include analyzing over one hundred fish to identify a disease associated with the fish in the enclosure 123.

The fish feeding detection mode can include a goal for providing a certain amount of food to the fish in the enclosure 123. For example, a goal can include feeding 1 kilogram of large or small pellet food to fish in the enclosure 123. The net inspection mode can include a goal of scanning the entire net of the enclosure 123 for one or more tears or holes. The camera can label the locations of the tears of holes in the net. The recording decision mode can include a mode for recording fish in the enclosure 123. One such goal can include, for example, identifying and categorizing one hundred fish in the enclosure 123.

The calibration mode can be a mode for calibrating the camera subsystem 118. Specifically, calibration mode can include a mode for (i) updating the trained machine-learning models, (ii) clearing the cache memory, (iii) receiving software updates from the remote server 102, and (iv) fixing the hardware components of the camera subsystem 118. Moreover, during the calibration mode, all other modes cease operation and a human operator can adjust the components of the camera subsystem 118. The calibration mode can also be instantiated by the scheduler 130 if the scheduler 130 determines the camera subsystem 118 is operating outside of its operating parameters. If the scheduler 130 detects the camera subsystem 118 is operating outside of its operating parameters, the scheduler 130 can cease the currently executing modes and start the calibration mode to move the camera subsystem 118 back to its normal operating parameters.

The simulation mode can be a mode for performing any of the other modes in a virtual manner. For example, the camera subsystem 118 can perform the simulation mode by executing any of the other modes, e.g., biomass detection mode, using previously recorded camera footage. The simulation mode can be performed on the camera subsystem 118 and results reported to the remote server 102.

The data transfer mode can be a mode for transferring data, e.g., video and/or images, to the remote server 102 for processing. The data processing mode can be a mode for further prioritizing various images, processing a backlog of images, and processing other sensor data. The human-intervention mode can be a mode where a human is to operate on the camera subsystem 118. The debugging mode can be a mode where the camera subsystem 118 is analyzed by a human operator, automatically by the remote server 102, or by a human operator at the remote server 102 for identifying and fixing one or more issues associated with the camera subsystem 118.

In some implementations, the smart mode selection system 100 can quantify one or more goals for each of the modes with a target precision. For example, instead of having a sea lice detection mode that seeks to define an integer ratio of lice per fish for 100 fish, the system 100 can define a ratio of lice per fish to 0.01 precision. In this case, a more accurate picture of lice found on fish can be identified. The precision on lice level can improve with high quality observations made during the sea lice detection mode. Additionally, the system 100 can determine over time that high sea lice quality observations are more likely to be made at nighttime than during the daytime. Therefore, to improve the precision of lice estimates on fish, the scheduler 130 can choose to execute the sea lice detection mode for more hours at nighttime than daytime to improve the detection of sea lice. In some cases, if the scheduler 130 is desperate for more precision numbers on sea lice before a deadline, e.g., before a treatment ship passes or before the sun rises in an area proximate to the camera subsystem 118 or the sea lice count from the prior mode execution did not meet its goal, and the goals for another mode have already been hit, the scheduler can subtract hours from the other mode and apply hours to the sea lice detection mode. The precision can be based on statistic calculations, requests from external users, observations seen, and other factors.

In some cases, the scheduler 130 can estimate the precision based on variance seen from observations. For example, if the scheduler 130 identifies 0.2 lice per fish on one day, 0 lice per fish on another day, and 3 lice per fish on another day, then the scheduler 130 can determine to execute the sea lice detection mode more often to obtain more samples and identify a more accurate precision value. This becomes important when external users request for a certain amount of precision on lice per fish. For example, some fish farmers desire lice per fish to be below 0.5 due to legal requirements. If the scheduler 130 determines the lice per fish is 0.5 or above, then a legal requirement exists for the farmer to treat the lice on the fish to avoid legal fines. In this case, the modes executed by the scheduler 130 can aid in determining a precise number of lice per fish.

In some implementations, the scheduler 130 can obtain external data and resources to determine which of the one or more modes for camera subsystem 118 to operate. Specifically, the scheduler 130 can communicate with the remote server 102 to request and receive external data from the remote server 102. For example, the remote server 102 can provide the user configuration 104, the harvest information 106, and the external data 108 to the scheduler 130. The remote server 102 can obtain external data 108 for external resources separate from the remote server 102. The external data 108 can include weather data 110 and treatment boat data 112.

As previously mentioned, the user configuration 104 can include information relating to the configuration of the winch subsystem 114, the camera subsystem 118, the lighting subsystem, and the feeder 120. For example, the user configuration 104 can include a configuration file that stores settings corresponding to the configuration of the smart mode selection system 100. An external user, such as a reviewer, can access the remote server 102 via a monitor and/or keyboard and set one or more values in the configuration file. Additionally and/or alternatively, the remote server 102 can learn values for the configuration file over time based on the execution of one or more modes of the camera subsystem 118. For example, the remote server 102 can iteratively determine the values of the camera subsystem 118's various positions when performing the net inspection mode.

The harvest information 106 can include information related to schedules for a farmer's harvesting of the fish. For example, the harvest information 106 can include dates and/or times when a farmer is deciding to harvest the fish found within the enclosure 123. A farmer can access the remote server 102 via monitor and/or keyboard and provide data indicative of dates and times when the farmer plans to harvest the aquatic livestock in the enclosure 123. As will be further described below, the scheduler 130 can utilize the harvest information 106 to aid in determining one or more modes for operating the camera subsystem 118.

In some implementations, the external data 108 can include the weather data 110 and the treatment boat data 112. The remote server 102 can ping nearby weather stations, the Internet, various weather measuring devices proximate to the enclosure 123, and other devices to determine the weather around a location of the enclosure 123. For example, the remote server 102 can identify a state of the atmosphere, including temperature, wind speed, rain or snow, humidity, and pressure data. Additionally, the weather data 110 can include cloud coverage or overcast days, an amount of sunlight, time for sunrise and sunset at a provided location, ocean wave height and length, and other weather data. Additionally, the weather data 110 can include a forecast of weather at a future day and time. The scheduler 130 can use the weather data 110 to predict which modes are to currently be used for operating the camera subsystem 118 and which modes are to be used in the future for operating the camera subsystem 118. The camera subsystem 118 can also estimate ambient light levels viewed by a lens of the camera subsystem 118.

The treatment boat data 112 can include data that specifies dates and times for the arrival of lice treatment ships. A lice treatment ship can be a ship that brings one or medicinal products to remove sea lice from farmed fish without releasing pesticides into the environment. In some implementations, a farmer using the remote server 102 can request a lice treatment ship to come clean the fish harvested from the enclosure 123. Specifically, the request can include a date and time for an arrival of the lice treatment ship. The treatment boat data 112 can include the date and time indicative of the arrival of the lice treatment ship. Additionally, the treatment boat data 112 can include a type of ship that is arriving and data indicative of the medicinal product used by the ship for application on the fish without affecting the nearby aquatic environment. The lice treatment ship can be invaluable because an infestation of lice may kill fish in the enclosure. If the scheduler 130 determines that a lice treatment ship is near or that the requested lice treatment ship is on its way, then the scheduler 130 can devote one or more modes to executing a sea lice detection mode on the camera subsystem 118.

The external data 108 can also include data related to a number of users working on a deck of the enclosure 123. The deck can be a walkable platform that the users can easily access the winch subsystem 114, the camera subsystem 118, the feeder 120, a net of the enclosure 123, the lighting subsystem, and the aquatic livestock 122 in the enclosure 123. The external data 108 can include a number of users working on the deck, a skillset of each of the users working on the deck, and the skillset of operators using the remote server 102. The scheduler 130 can provide this data relating to the number of operators and the skillset as input to the trained machine-learning model to aid in selecting a manual intensive mode if the number of operators and their skillset is high. Alternatively, a manual intensive mode is likely to be unselected if the number of operators are low and the skillset of the operators present is low.

In some implementations, the remote server 102 can transmit the user configuration 104, the harvest information 106, and the external data 108 to the camera subsystem 118. Specifically, the remote server 102 can generate a package 116 of the user configuration 104, the harvest information 106, and the external data 108. Then, the remote server 102 can transmit the package 116 to the camera subsystem 118.

In some implementations, the remote server 102 can transmit the package 116 on a periodic basis. Each time an update is made to the user configuration 104, the harvest information 106, or the external data 108, the remote server 102 can generate a new package 116 and transmit the new package 116 to the camera subsystem 118. A user interacting with the user configuration 104, the harvest information 106, or other information on the remote server 102 can provide the updates. For example, a user can request the camera subsystem 118 to transition to a specific mode or modes of operation through interaction with the remote server 102. Additionally, the updates can be performed each time the remote server 102 retrieves new external data for the weather data 110 and/or the treatment boat data 112. The updates can be requested for on an hourly, daily, weekly, or monthly basis, to name a few examples. In some examples, the updates may be performed at random intervals. The remote server 102 can also poll external components to retrieve new external data 108. Additionally or alternatively, the remote server 102 can receive new external data 108 without requesting for new data. Thus, each time a new update is received by the remote server 102, the remote server 102 can generate a new package 116 with the new updates and subsequently transmit the new package 116 to the camera subsystem 118.

In some implementations, the scheduler 130 can receive the package 116 from the remote server 102. The scheduler 130 can extract the components from the package 116 to identify instructions for camera subsystem 118 operation. For example, as illustrated in system 100, the scheduler 130 can extract the user configuration 104, the harvest information 106, and the external data 108 from the package 116 to use as input. Additionally, the scheduler 130 can obtain data indicative of the current mode 124 operating on the camera subsystem 118, data from other modes 126, and priority ranking 128.

The data indicative of the current mode 124 can include an identifier for one or more modes currently operating on the camera subsystem 118. For example, the camera subsystem 118 may be currently performing the net inspection and decision-making around whether to record modes. In another example, the camera subsystem 118 may be currently performing the feeding decision mode. Other examples are also possible. Each of these modes can be designated with an identified, e.g., "0011," that signifies to the scheduler 130 a mode. Additionally, the data indicative of the current mode 124 can also indicate a status of the goal of the current mode. For example, if the mode is sea lice detection and its goal is to define a ratio of lice per fish for 100 fish, then the data indicative of the current mode 124 can include a status of how far the camera subsystem 118 is from reaching the goal. The camera may have a current ratio of 1/5 for 5 fish, of 10/20 for 80 fish, or another example. By providing the identifier of the mode and how far the mode is in completing its goal, the scheduler 130 can determine whether the current mode should continue to run or whether other modes should run on the camera subsystem 118.

The data from other modes 126 can include an identifier for each of the modes and data identifying the goals for each of the modes. The camera subsystem 118 can store data indicative of each of the modes. The data indicative of each of the modes can include an identifier of each of the modes, e.g., a number or word, and include one or more goals associated with each of the modes. In some implementations, the package 116 can include a new mode to be used by the camera subsystem 118. A user at the remote server 102 can define the new mode and characteristics of the new mode. As such, external parties at the remote server 102 can define one or more goals associated with the customized modes and can customize modes. Additionally, a user can define whether the customizable mode is hardware or limited-hardware dependent, which indicates to the scheduler 130 whether other modes can run in addition to the customizable mode. As a result, the scheduler 130 can use the data from other modes 126 to determine whether different modes should be running on the camera subsystem 118 than those currently operating.

In some implementations, the camera subsystem 118 can include a priority ranking 128. The priority ranking 128 can include data representing the importance associated with each mode. The data representing the importance associated with each mode can include, for example, a weight value, a number indicative of a rank, a percentage, and other values indicative of ranks. For example, the priority ranking 128 can indicate that the sea lice detection mode has a priority ranking of 1, the biomass detection mode has a priority ranking of 2, the net inspection mode has a ranking of 3, the decision around whether to record mode has a priority ranking of 4, and the feed decision making mode has a priority ranking of 5. In another example, the priority ranking 128 can indicate that the sea lice detection mode has a weighted value of 0.75, the biomass detection mode has a weighted value of 0.65, the net inspection mode has a weighted value of 0.64, the decision around whether to record mode has a weighted value of 0.3, and the feed decision making mode has a weighted value of 0.1. Other ranking values and weighted values are also possible.

The scheduler 130 can analyze the priority ranking 128 to determine which mode or modes to operate based on order of importance or preference. A user at the remote server 102 may define the priority associated with each mode. The remote server 102 can provide the priority ranking 128 in the package 116. In some implementations, the priority ranking 128 is only provided to the scheduler 130 once, for when the modes are initially defined. The priority ranking 128 is updated when a user provides updates of importance from the remote server 102.

In some implementations, the scheduler 130 can also obtain other data for analyzing which mode or modes to operate on the camera subsystem 118. Specifically, the other data can include power availability data, connectivity data, data indicating presence of foreign fish, data indicative of fish behavior, research priorities, data indicating knowledge about diseases or environmental factors on nearby farms, results from other modes, data indicating distribution of fish in the enclosure 123, and a hardware status or maintenance of the camera subsystem 118. The scheduler 130 can analyze the data received from the remote server 102, the other data, and any data internal or external to the camera subsystem 118 to identify one or more modes for camera operation.

The power availability data can indicate whether the camera subsystem 118 includes power for charging the camera at a given location. Specifically, the power availability data can indicate an amount of power available for the camera subsystem 118 and a length of time the amount of power can be provided to the camera subsystem 118. For example, power outlets in Norway can provide 230 Volts and 50 Hz of alternating current (AC) electricity for an extended period of time. In another example, if only a power generator is available, then only 230 Volts and 50 Hz of AC electricity can be provided for a short period of time.

The connectivity data can indicate whether the camera subsystem 118 has access to communicate with the remote server 102 at a given location. The camera subsystem 118 can determine a throughput and latency amount from the camera subsystem 118 to the remote server 102 to determine whether the connectivity is sufficient or insufficient for certain modes. In this manner, the scheduler 130 can determine a type of mode or modes to run that require a certain connectivity.

The data indicating a presence of foreign fish can include data that indicates other types of fish than the intended aquatic livestock to be monitored by the smart mode selection system 100. For example, the enclosure 123 may seek to house only salmon or koi fish. If the camera subsystem 118 determines that other fish types are found within the enclosure 123, then the camera subsystem 118 can provide flags or indications in the data indicating a presence of foreign fish. For example, the camera subsystem 118 can monitor the aquatic livestock 122 within the enclosure 123. The camera subsystem 118 can utilize one or more machine-learning models that have been trained to identify a type of fish from video or images, e.g., a classifier. The trained models can produce an indication of whether an identified fish is salmon, koi, cod, mackerel, shark, or other types of fish. Based on the indication, the camera subsystem 118 can store data that indicates a presence of foreign fish in memory to be used by the scheduler 130. For example, the data stored may include a count or a number of identified fish for each of the fish types, e.g., 100 salmon, 2 cod, and 1 koi fish.

The data indicative of fish behavior can include times of the day, amount of time, and certain days when fish are feeding. For example, the camera subsystem 118 can determine feeding times by knowing when the feeder 120 is active, e.g., providing food to the aquatic livestock 122, and for how long the feeder 120 is active. Additionally, the camera subsystem 118 can determine feeding time based on a detection of frenzied feeding behavior by the aquatic livestock 122 in the enclosure 123. Frenzied feeding behavior can be analyzed and detected by one or more trained machine-learning models that are configured to detect fish frantically eating from the feed. On the other hand, the camera subsystem 118 can determine a time when the feeding has ceased based on a detection of one or more food items within the water. If the camera subsystem 118 detects food items from the feeder 120 floating in the water, then the camera subsystem 118 can determine that the aquatic livestock 122 have ceased feeding. The camera subsystem 118 can determine that the aquatic livestock 122 feed from 9:00 AM to 11:00 AM, each day, and from 4:00 PM to 5:00 PM, each day, to name one example. Other examples of data indicative of fish behavior are also possible.

The research priorities can include data that indicates one or more enclosures that are currently under investigation for research. For example, some enclosures may be used to monitor aquatic livestock to conduct trials on different sea lice removal techniques, fish genetics, net inspection techniques, and different types of techniques. The scheduler 130 can receive data from the remote server 102 that indicates which enclosures are currently being monitored for research. For example, the data indicating enclosures can include enclosure representations, e.g., "ENCLOSURE1" or "110011," that signal to the scheduler 130 information pertaining to various enclosures. If the scheduler 130 determines its location is servicing an enclosure that is currently being monitored for research purposes, then the scheduler 130 can determine to add more time to modes for the research being studied and subtract time from other modes that are not currently being studied.

The data indicating knowledge about diseases or environmental factors on nearby farms can include data indicative of diseases that may cause harm to the aquatic livestock 122 in the enclosure 123. The remote server 102 may receive data from other remote servers associated with different enclosures. This data from the other remote servers can indicate different diseases and/or environmental factors found at these different enclosures. For example, if a nearby enclosure has or had an infestation disease affecting their aquatic livestock, then the corresponding remote server can provided data indicative of a type of the disease to the remote server 102. Then, the remote server 102 can instruct the camera subsystem 118 to operate in a mode to search for aquatic livestock 122 that have the disease identified by the other remote server. As such, the camera subsystem 118 can take into consideration disease reports from one or more nearby enclosures in order to decide which mode to run. In some cases, disease reports are made publically available by government agencies and can be used to augment monitoring for diseases by various camera subsystems at proximate enclosures. The environmental factors can relate to oil spills in the water, salinity level of the water, algae buildup in certain areas, dissolved oxygen content, weather forecasts, temperature gradients, and other environmental related factors.

The results from other modes can include other modes that have previously operated on the camera subsystem 118. In some cases, one mode of the camera subsystem 118, e.g., biomass detection, may not have viewed a large enough number of fish to make a sufficient estimate on the biomass of fish in the enclosure. However, another mode, e.g., sea lice detection, may have seen a sufficient number of fish, and determined a ratio of lice per fish that met a desired goal. As such, the next time sea lice detection mode is operated on the camera subsystem 118, the scheduler 130 can subtract an amount of time, e.g., 3 hours, from the one mode that has sufficiently reached its goal, e.g., sea lice detection mode, and add that subtracted time to a mode that did not previously reach its goal, e.g., biomass detection mode, during the next execution of the mode. In this example, the camera subsystem 118 can execute the biomass detection mode for three hours longer than typically executed in order to achieve desired accuracies for the goal or goals associated with the biomass detection mode. Other examples are also possible.

The data indicating distribution of the aquatic livestock 122 indicates characteristics of aquatic livestock 122 found in the enclosure 123. For example, the data can indicate a type of fish, a size of fish, a sex of the fish, e.g., male or female, a color of the fish, a shape of a fish's head, location of fish mouth, fin type, fin location, stripes, spots, or any other characteristics used to differentiate fish from one another. The distribution of the aquatic livestock 122 can further provide an overall distribution of the type of fish and their make-up in the enclosure 123. The distribution of the type of fish can be compared between different enclosures to determine how accurate the results are for one or more modes that operate on the camera subsystem 118. For example, a distribution in one enclosure that is more heavily weighted with salmon may indicate that a sea lice detection mode should be performed. In some examples, a distribution in one enclosure that is more heavily weighted with codfish and not salmon may indicate that a net inspection mode should be performed in that respective enclosure because only salmon are to be within the enclosure. Other examples are also possible.

The hardware status or maintenance of the camera subsystem 118 can indicate an operation of the camera subsystem 118. Specifically, the hardware status can indicate whether one or more components of the camera subsystem 118 are properly working or functioning in a desired manner. For example, the camera subsystem 118 can include one or more components that may or may not function properly, e.g., one or more LEDs, a zoom function, a power button, a recording feature, an actuator for rotating the camera subsystem 118, and other components. Moreover, the hardware status can also indicate whether the winch subsystem 114, the pulley connected to the winch subsystem 114, the lighting subsystem, and the feeder 120 are all properly working. For example, if the camera subsystem 118 determines that one or more LEDs are not working properly, then the scheduler 130 can choose to execute modes that do not require LED lights. In another example, if the scheduler 130 determines that the winch subsystem 114 is not properly working, or a mechanical failure exists with the pulleys, then the scheduler 130 can determine which modes can run from a current location of the camera subsystem 118 without moving the camera subsystem 118 and ultimately, biasing the results of the modes.

In some implementations, the scheduler 130 can rely on other factors to determine which mode or modes to execute. For example, the scheduler 130 can analyze a number of aquatic livestock 122 identified in the enclosure, type of aquatic livestock 122, a frequency of running various modes, and an average of how long each mode has executed. For example, if there is a low number of livestock identified, then the scheduler 130 can decide to perform a net inspection mode. However, if there is a large number of livestock identified, then the scheduler 130 can decide to perform biomass detection mode, sea lice detection mode, or feeder mode, to name a few examples. In another example, the scheduler 130 can analyze the type of aquatic livestock 122 identified in the enclosure 123. If the wrong type of aquatic livestock is identified, then the scheduler 130 can perform the net inspection mode. If the correct type of aquatic livestock is identified, then the scheduler 130 can perform biomass detection mode, sea lice detection mode, or feeder mode.

In another example, the scheduler 130 can analyze the frequency with which modes are run to determine which current modes to run. For example, the scheduler 130 can determine that sea lice detection mode runs every Tuesday and Thursday from 9:00 PM to 12:00 PM. As such, the scheduler 130 can ensure the sea lice detection mode operates on these days and times next week. In another example, if the scheduler 130 determines that one of the modes does not operate on a periodic frequency, then the scheduler 130 can add that mode to a schedule to operate on a periodic frequency, e.g., once a week, twice a week, or three times a week, to name a few examples.

In another example, the scheduler 130 can analyze an average length of time each mode has previously executed. For example, if the scheduler 130 determines that the sea lice detection mode and the biomass detection mode both executed an average of nine hours over the past week and the feeder mode has executed an average of four hours over the past week, then the scheduler 130 can determine to add five more hours to the feeder mode for next week. In some cases, adding an amount of time to one or more modes reduces a similar amount of time to the other modes. However, maintaining a fare balance between the modes ensures each mode is given proper weight and accordance for achieving their respective goals.

In some implementations, the scheduler 130 can include one or more trained machine learning models configured to produce one or more outputs regarding modes to execute successfully on the camera subsystem 118. The remote server 102 can train one or more machine-learning models to perform a variety of functions. The functions can include, for example, to (i) identify one or more modes to operate on the camera subsystem 118, (ii) produce likelihoods of the one or more modes that should be currently operating on the camera subsystem 118, (iii) produce likelihoods of the one or more modes that should not be operating on the camera subsystem 118, and (iv) produce likelihoods of the one or more modes that should operate on the camera subsystem 118 at a future day and time. The remote server 102 can train the one or more machine-learning models to perform one or more of these functions, and transmit the trained machine-learning models to the camera subsystem 118 for operation.

For example, the trained machine-learning models can be convolution neural networks (CNNs). The remote server 102 can train the machine-learning models using data related to ambient light, power availability, connectivity, presence of foreign fish, fish behavior, opportunities for disease treatments, harvest schedules, research priorities, knowledge about diseases or environmental factors at nearby farms, results from other modes, distribution of fish, hardware status or maintenance, priority rankings, user configuration, and a current mode. To identify training data, the remote server 102 can analyze historical data to determine data values that were present when certain modes reached their goals.

For example, the remote server 102 can identify values of ambient light that indicate low levels of light, values of data indicative of nearby lice treatment ships, and data indicative of diseases identified from nearby pens and pair these values with a sea lice detection mode. In particular, remote server 102 can pair the input data with particular modes and provide this paired data as input to the one or more machine-learning models to produce an output that matches an indication that the sea lice detection mode is the highest likely mode to execute, in this example. The remote server 102 can configure the one or more machine-learning models to output percentages, likelihoods, numbers, e.g., 1-100, weights, or other values representative of the modes to execute on the camera subsystem 118.

In another example, the remote server 102 can identify values that illustrate broken hardware of the camera subsystem, broken hardware of the winch subsystem 114, a clear harvest schedule, and a low connectivity, and pair this data with a simulation mode and a calibration mode. In this manner, the scheduler 130 can determine that either a simulation mode or a calibration mode should be performed on the camera subsystem 118 when the input data indicates that one or more components of the camera subsystem 118 are broken, no harvesting of the aquatic livestock is to be performed in the near future, and/or there is low or no connectivity to the remote server 102 from the camera subsystem 118. The simulation mode and/or calibration mode can be performed in these scenarios when the aforementioned inputs are present because the camera subsystem 118 is not able to perform other modes due to broken components and disconnection from the remote server 102.

In another example, the remote server 102 can identify values that illustrate the presence of foreign fish, values that illustrate fish feeding behavior as not feeding, and values that indicate a spread of fish distribution, and pair this data with a net inspection mode. The remote server 102 can pair this data with the net inspection mode when the aforementioned inputs are present because the camera subsystem 118 should seek out one or more holes in the enclosure 123 that enable different fish to enter the enclosure. The different fish may not feed in a similar manner as salmon typically feed, for example. The spread of fish distribution can indicate a wide variety of different types of fish, such as fish that are not supposed to be within the enclosure 123. Similarly, data indicative of the presence of foreign fish can also indicate that different types of fish are found within the enclosure 123 and these fish should not be within the enclosure. As such, the camera subsystem 118 should perform the net inspection mode. Other examples are also possible.

Thus, the remote server 102 can train the one or more machine-learning models to identify one or more modes for operation on the camera subsystem 118. Additionally, the one or more machine-learning models can be trained to identify one or more modes for future operation on the camera subsystem 118. Specifically, the remote server 102 can train the one or more machine-learning models to predict modes of operation one day in advance, two days in advance, one week in advance, and other future days in advance. The remote server 102 can train the machine-learning models to predict the modes of operation by providing (i) data indicative of the input values and (ii) data indicative of how the input values change over time. By providing (ii) the data indicative of how the input values change over time, the scheduler 130 can recognize which modes are desirable to run in the future.

For example, the remote server 102 may desire to produce a trained machine-learning model that can predict one or more modes for the camera subsystem 118 to run in three days' time. As such, the remote server 102 can obtain different sets of data over three days' time. For example, the data can include ambient light values, power availability values, fish behavior values, and connectivity values, over a previous time range of Monday through Wednesday, Tuesday through Thursday, Wednesday through Friday, Thursday through Saturday, and Friday through Sunday. These values can include the starting values from each three-day set and the remote server 102 can analyze how these values change from the initial value over the three day set. Moreover, the remote server 102 can pair the (i) input data and (ii) the change in input data over the three day set with the mode to be run at the end of the third day. In this manner, the remote server 102 can train the one or more machine-learning models to identify one or more modes to run in three days' time based on input data values alone. In this example, the mode or modes executed at the end of the third day can represent the desired modes that were previously executed on the camera subsystem 118. In some examples, the mode or modes executed at the end of the third day can represent the desired modes input by a user or reviewer of the smart mode selection system 100. Other numbers of future prediction days are also possible, such as one day, two days, or more.

In response to training the one or more machine-learning models to predict current modes for operating the camera subsystem 118 and/or future modes for operating the camera subsystem, the remote server 102 can transmit the trained machine-learning models to the camera subsystem 118 over a network. In some cases, the remote server 102 and the camera subsystem 118 can be connected via a cable. In some cases, the remote server 102 and the camera subsystem 118 can communicate via Wi-Fi, Bluetooth, Cellular, e.g., 4G, 5G, or ZigBee, to name a few examples.

In response to receiving the trained machine-learning models, the camera subsystem 118 can execute the trained machine-learning models to predict one or more modes to execute. Specifically, the scheduler 130 can determine one or more modes that should execute on the camera subsystem 118. The scheduler 130 can obtain inputs related to the user configuration 104, the harvest information 106, the external data 108, the current mode 124, the data from other modes 126, the priority ranking 128, and the other previously mentioned data, to output an indication of how likely each of the one or more modes should be executing on the camera subsystem 118.

The output of the scheduler 130's trained machine-learning model can include a percentage for each of the modes. For example, the trained machine-learning model can output a 20% likelihood for the sea lice detection mode, a 10% likelihood for the biomass detection mode, a 40% likelihood for the feed mass decision making mode, a 90% likelihood for the net inspection mode, and a 98% likelihood for the recording decision mode. The trained machine-learning mode can also output likelihoods for a calibration mode, a debugging mode, a simulation mode, a fish identification mode, and any other modes.

In response to outputting likelihoods for each of the modes, the scheduler 130 can compare the likelihood associated with each mode to a threshold value. For example, a designer of the smart mode selection system 100 can set the threshold value to be 75%. Other threshold values are also possible. The designer can set the threshold to be higher to improve the accuracy of the scheduler 130's predictions. In some cases, the designer can set the threshold to be lower to acquire more training data for the trained machine-learning model.

For example, the scheduler 130 may predict for the net inspection mode and the recording decision mode to be executed on the camera subsystem 118. However, a user monitoring the actions of the scheduler 130 through the remote server 102 may determine that the scheduler 130 selected the wrong modes. In response, the user can request that the remote server 102 retrain the one or more trained machine-learning models to predict the net inspection mode and the recording decision mode. The scheduler 130 can transmit the current inputs, the trained machine-learning models, the erred selected modes, and the desired modes to the remote server 102. The remote server 102 can retrain the trained machine-learning model to predict the net inspection mode and the recording decision mode using the received current inputs. When the trained machine-learning models accurately predicts the net inspection mode and the recording decision mode from the current inputs, then the remote server 102 can transmit the revised trained machine-learning model back to the scheduler 130 for further processing. Other modes to be selected can also be used for retraining and feedback of the trained machine-learning models.

However, the scheduler 130 can accurately output likelihoods of 90% for the net inspection mode, and a 98% for the recording decision mode. In response, the scheduler 130 can compare the output likelihoods to the threshold value of 75% to determine the net inspection mode and the recording decision mode likelihoods satisfy the threshold value. Satisfying the threshold value can include exceeding or equaling the threshold value. In response to determining that the likelihoods satisfy the threshold value, the scheduler 130 can retrieve the one or more models associated with the net inspection mode and the recording decision mode. For example, as illustrated in system 100, the scheduler 130 can select the model of the net inspection mode 142 and the model of the recording decision mode 144.

In some implementations, the scheduler 130 may determine that an output likelihood corresponding at least one of the hardware dependent modes is greater than a threshold value. In this case, the scheduler 130 can select one hardware dependent mode to execute on the camera subsystem 118 based on the requirements of the corresponding mode. Generally, one hardware dependent mode can execute on the camera subsystem 118 at a time due to the demands of the hardware dependent mode. However, multiple limited-hardware dependent modes can execute in parallel.

In some implementations, the scheduler 130 may determine that multiple output likelihoods satisfy the threshold value. For example, an output likelihood for each of the limited-hardware dependent modes 140 and one output likelihood for a hardware dependent mode 132 satisfy the threshold value. In this case, the scheduler 130 can select a specific mode to run using the priority ranking 128 information. Specifically, the scheduler 130 can select a mode with an output likelihood that satisfies the threshold value and has the highest ranking on the priority ranking 128 as the mode to currently execute on the camera subsystem 118. In some cases, the scheduler 130 can select the specific mode with an output likelihood that satisfies the threshold value and requires completing its corresponding goals. If the scheduler 130 determines that the other modes which satisfy the threshold value have had their goals completed and are ranked higher than the a specific mode which does not have its goal yet completed, then the scheduler 130 can select the specific mode to execute on the camera subsystem 118 to complete its goal. Other examples are also possible.

The various modes included in the camera subsystem 118 can be separated as hardware dependent modes 132 and limited-hardware dependent modes 140. For example, the hardware dependent modes 132 can include sea lice detection mode 134, biomass detection mode 136, feeding decision making mode 138, calibration mode, simulation mode, and a debugging mode, among others. The limited-hardware dependent modes 140 can include net inspection of the enclosure 123 and decision making regarding whether to record decision mode 144. Other modes are also possible.

As illustrated in system 100, the scheduler 130 retrieves models at 146. The camera subsystem 118 can store in memory models associated with each of the modes. The models are configured to instruct the camera subsystem 118 to perform the tasks of the models until a designated goal or goals associated with the mode have been met. For example, the models associated with the modes to be run are loaded into the cache memory of the camera subsystem 118 and executed until the designated goal or goals associated with the modes have been met.

In some implementations, the models are stored on the remote server 102 because of the limited memory capabilities of the camera subsystem 118. In the instance the camera subsystem 118 needs to access one or more models on the remote server 102, the scheduler 130 can transmit a request to the remote server 102 for the model of the net inspection mode 142 and the model of the recording decision mode 144. In response to receiving the request, the remote server 102 can transmit the requested models to the camera subsystem 118 for operating. However, the camera subsystem 118 may clear its memory contents to ensure a sufficient amount of space exists for the requested models. In this instance, the camera subsystem 118 can request models from the remote server 102 each time a new mode is desired to be run to ensure storage capacity is not exceeded.

Specifically, the camera subsystem 118 may store the data locally when the camera subsystem 118 records data, e.g., video and media, of the aquaculture livestock. This data may take up a large portion of space in local memory. As such, the camera subsystem 118 needs to preserve a sufficient amount of space for video and photo storage and a sufficient amount of space for the models associated with each of the modes. Therefore, the camera subsystem 118 may request the models from the remote server 102 for execution and can delete the models from memory in response to the end of their execution. In this manner, sufficient space exists on the camera subsystem 118 for the next models associated with the modes to be executed.

As illustrated in system 100, once both models are stored on the camera subsystem 118, the camera subsystem 118 can execute both models in parallel in 148. As previously mentioned, the camera subsystem 118 can execute one or more models associated with limited-hardware modes in the background or in parallel. In this case, the camera subsystem 118 can achieve multiple goals simultaneously associated with each of the limited-hardware dependent modes.

Figure 1B:
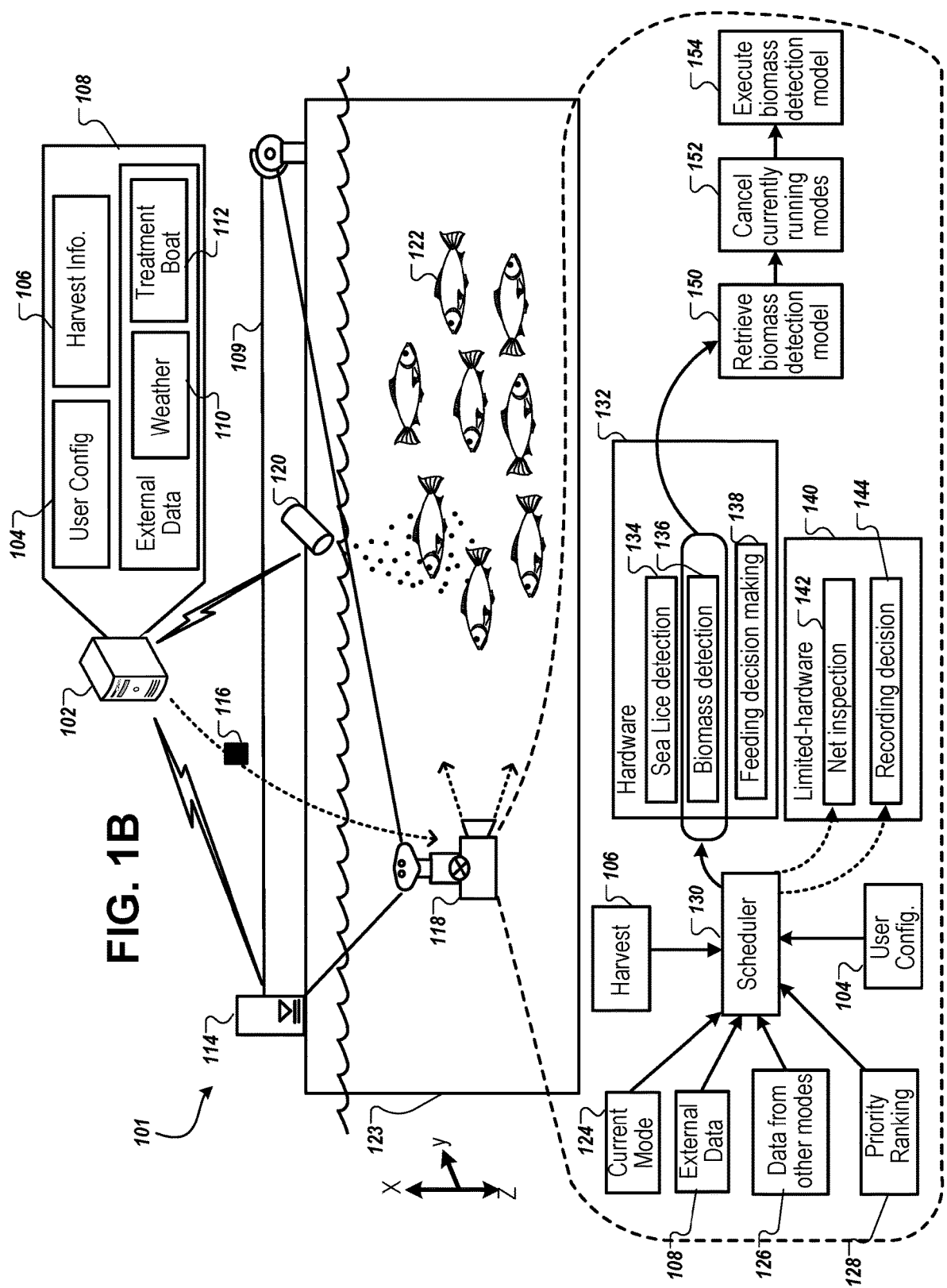
FIG. 1B is another diagram of an example smart mode selection system and an enclosure that contains aquatic livestock.

FIG. 1B is another diagram of an example smart mode selection system 101 and an enclosure that contains aquatic livestock. The system 101 includes similar components to system 100. Moreover, the system 101 is continuation of the processes performed with respect to system 100.

In some implementations, the camera subsystem 118 performs the processes related to the currently operated modes. For example, system 100 illustrated the net inspection mode 142 and the recording decision mode 144 being selected by the scheduler 130. In response, the scheduler 130 selects models associated with the net inspection mode 142 and the recording decision mode 144 and instantiates these models on the camera subsystem 118 for underwater operation.

While the camera subsystem 118 is performing the processes related to the modes currently executing, the scheduler 130 is running various processes on a continuous basis to monitor whether the current modes need to be adjusted based on a state of the environment of system 101. In some implementations, the scheduler 130 can replace currently executing modes on the camera subsystem 118 with one or more new modes. The scheduler 130 can replace modes that have completed their goals with one or more new modes. Additionally, the scheduler 130 can replace currently executing modes even if they have not yet completed their corresponding goals.

The scheduler 130 can process inputs related to the user configuration 104, the harvest information 106, the external data 108, the current mode 124, the data from other modes 126, the priority ranking 128, and the other previously mentioned data on a continuous basis. Specifically, the scheduler 130 can process these inputs every minute, every five minutes, every 30 minutes, every hour, every day, every week, or every month, to name a few examples. The scheduler 130 can also process these inputs each time the input data changes. For example, the scheduler 130 may obtain a new hardware status of the camera subsystem 118, receive new input data from the remote server 102, and receive data from the camera subsystem 118 indicative of aquatic livestock detection in the enclosure 123. In response to receiving a change in input, the scheduler 130 can generate new outputs indicative of how likely each of the one or more modes should be executing on the camera subsystem 118.

In some implementations, the scheduler 130 can provide the inputs to the trained machine-learning model to generate new outputs on a continuous basis. In response to generating the new outputs, e.g., likelihoods for each of the modes to execute on the camera subsystem 118, the scheduler 130 can determine whether the new outputs satisfy a threshold value. If one or more of the new outputs satisfy the threshold value, then the scheduler 130 can determine whether the modes corresponding to the new outputs that satisfy the threshold value should be executing on the camera subsystem 118.

For example, as illustrated in system 101, the camera subsystem 118 currently executes the net inspection mode 142 and the recording decision mode 144. The scheduler 130 can output a likelihood of 95% that the biomass detection mode 136 should be currently executing on the camera subsystem 118 based on the inputs. The inputs can provide the scheduler 130 a holistic view that represents a current state of the system 101. In response, the scheduler 130 can compare the likelihood of 95% to the threshold value of 75%. The scheduler 130 can determine that the likelihood of 95% for the biomass detection mode 136 satisfies the threshold value.

Then, the scheduler 130 can compare the currently executing modes on the camera subsystem 118 to the one or more modes recently generated by the scheduler 130 that exceed the threshold value. Continuing with the example, the scheduler 130 can determine that the net inspection mode 142 and the recording decision mode 144 are different from the biomass detection mode 136. In response, the scheduler 130 can determine to cease processing of the net inspection mode 142 and the recording decision mode 144 and to replace these modes with the processing of the biomass detection mode 136.

For example, the scheduler 130 can retrieve the biomass detection model 150 that corresponds to the biomass detection mode 136. In some cases, the scheduler 130 can transmit a request for the biomass detection model 150 to the remote server 102. In some cases, the scheduler 130 can access the biomass detection model 150 locally in the memory of the camera subsystem 118. Then, the scheduler 130 can cancel the currently running modes in 152. Specifically, this includes stopping the processing of the currently running modes, e.g., the net inspection mode 142 and the recording decision mode 144. Additionally, stopping the processing of the currently running modes includes the scheduler 130 removing the models associated with the previously running modes from the cache memory of the camera subsystem 118.

In some implementations, in response to the scheduler 130 ceasing the processing of currently running modes, the camera subsystem 118 may return to a starting position. The starting position can include a location of the camera subsystem 118 in the enclosure 123 that enables the camera subsystem 118 to perform additional modes. For example, the starting position of the camera subsystem 118 can include a center of the enclosure 123 above water. In another example, the starting position of the camera subsystem 118 can include a center of the enclosure 123 below water. By moving the camera subsystem 118 to the starting position after ceasing the modes, the camera subsystem 118 can advantageously start the next modes with fewer movements. In this manner, the camera subsystem 118 can move a non-visible amount of time and efficiently switch between modes.

For example, if the camera subsystem 118 was performing net inspection mode, and the camera subsystem 118 stopped after reaching a goal of the net inspection mode, the camera subsystem 118's final position may be at a bottom corner of the enclosure 123 and one foot away from the net of the enclosure 123. If the next mode to be executed on the camera subsystem 118 was the simulation mode, then at the start of simulation mode, the camera subsystem 118 would have to completely re-orient itself by moving to the center of the enclosure 123 and below the surface of the water. This movement can waste time and can be inefficient. To compensate, the camera subsystem 118 can move to the starting position at the end of a mode, e.g., whether mode completed its goal or not, to prepare for the next mode to begin.

In some implementations, the camera subsystem 118 may only be operating the net inspection mode 142. The scheduler 130 may determine based on a state of the inputs that the net inspection mode 142 and the recording decision mode 144 should be executing on the camera subsystem 118. In this case, the camera subsystem 118 can continue performing the tasks related to the net inspection mode 142 and the scheduler 130 can retrieve the model for the recording decision mode 144 and execute that model in parallel on the camera while the model for the net inspection mode currently executes.

In another example, the scheduler 130 may determine based on a state of the inputs that only the net inspection mode 142 should be running. Continuing with the example from above, the scheduler 130 can cease the processing of the recording decision mode 144 while the net inspection mode 142 continues to execute. In this manner, the scheduler 130 provides functionality for starting new modes, starting one or more new modes while one or more modes are currently executing on the camera subsystem 118, stopping one or more modes that are currently executing, and stopping one or more modes while one or more other modes continue to execute on the camera subsystem 118.

In some implementations, the scheduler 130 can continuously produce new outputs from the inputs in real time. While the camera subsystem 118 operates one or more currently executing modes, the scheduler 130 can iteratively generate new output likelihoods associated with the modes based on the provided inputs. For example, the camera subsystem 118 can execute the sea lice detection mode 134 while the scheduler 130 iteratively and in a continuous fashion, generates new output likelihoods associated with each of the modes, and determines whether to cease the currently operating modes on camera subsystem 118 or replace one or more of the currently operating modes on the camera subsystem 118 with a different or different modes.

In some implementations, the scheduler 130 can receive a schedule for executing one or modes on the camera subsystem 118 in the user configuration 104. The schedule can include one or more modes to be executed on the camera subsystem 118 over a period of time. The period of time can include, for example, a day, a week, a few weeks, a month, and longer, naming some examples. The schedule may be initially set up as executing each of the modes equally throughout the day. For example, for a number of modes N, the scheduler 130 can run each mode for an equal amount of time in a particular day to ensure that each mode runs on the camera subsystem 118. Other configurations for scheduling an amount of time for each mode are possible and can be customizable by a user of the remote server 102.

In some implementations, the scheduler 130 can generate a schedule for executing one or more modes on the camera subsystem 118. The generated schedule can include one or more modes to be executed on the camera subsystem 118 over a period of time. The scheduler 130 can generate the schedule using the schedule received from the remote server 102 and based on historical usage of the camera subsystem 118. For example, the scheduler 130's trained machine-learning models can predict how the camera subsystem 118 is to be used for the future day, week, or month, etc., and generate a predicted schedule for the camera subsystem 118's operation.

Then, the scheduler 130 can utilize the generated schedule to operate the camera subsystem 118. As the camera subsystem 118 operates according to the generated schedule, the scheduler 130 can adjust the generated schedule on the fly based on a current state of the system 101. For example, the generated schedule indicates that biomass detection runs from 8:00 AM to 11:00 AM. During the camera subsystem 118's operation of the biomass detection, the camera subsystem 118 can detect a tear in the net of the enclosure 123, can receive information from the remote server 102 that a tear in the net of the enclosure 123 has occurred, or can detect new fish not previously identified in the enclosure 123. In response, the scheduler 130 can adjust the generated schedule to cease processing of the biomass detection, and start the processing of the net inspection mode to identify the tear in the net. Once the tear has been identified, the scheduler 130 can alert the remote server 102 of the location and identification of the tear for a repairperson to fix that location of the net in the enclosure 123. Other examples are also possible.

In some implementations, the priority ranking 128 can be adjusted. As previously mentioned, the priority ranking 128 can include data representing the importance associated with each mode. For example, sea lice detection mode can have a rank of 1; biomass detection mode can have a rank of 2; and, so on. The scheduler 130 can adjust the rankings associated with each of the modes' priority ranking value. After the camera subsystem 118 achieves the one or more goals for a mode, the scheduler 130 can move that mode to the bottom of the priority ranking 128. For example, the camera subsystem 118 currently performs the task related to the sea lice detection mode, which has a rank of 1. In response to completing the tasks related to the sea lice detection mode and achieving its goals, the scheduler 130 can move the ranking of the sea lice detection mode to the bottom of the rank, e.g., rank value of 10, for example.

In some implementations, the rankings associated with each mode in the priority ranking 128 can adjust after a set amount of time has elapsed from the completion of each mode. Specifically, after the camera subsystem 118 has completed executing a mode and the mode has been placed at the bottom of the priority ranking 128, the scheduler 130 can start a timer associated with the mode. As the timer associated with the mode elapses, the priority ranking or importance of that mode changes. Specifically, the priority ranking of that mode increases as the timer elapses more and more. For example, the mode may start at rank 10 after completion. After one day has elapsed, that mode can move up in rank-to-rank 8. After one week has elapsed, the mode may move up to rank 2. Each mode has a relative priority or importance that changes after a set of amount of time since that mode has been run on the camera subsystem 118. The scheduler 130 can use these ranks to determine which modes to operate.

In some implementations, if the scheduler 130 ceases a mode before the camera subsystem 118 achieves the goal of that mode, the priority ranking of that mode remains the same. In this manner, the scheduler 130 can recognize that this mode remains high on the priority list and the camera subsystem 118 needs to complete the mode's task to achieve its goal(s). For example, the camera subsystem 118 can perform the feeding decision making mode 138 because the rank associated with the feeding decision making mode 138 is of rank 1. However, during the operation of the feeding decision making mode 138, the camera subsystem 118 can detect one or more fish that are not supposed to be the enclosure 123. In response, the scheduler 130 can cease processing of the feeding decision making mode 138 and instantiate the net inspection mode 142 to identify a tear in the net that may indicate how the unwanted fish entered the enclosure 123. During this time, the feeding decision making mode 138 is still set to a rank of 1 to signify to the scheduler 130 that the feeding decision making mode 138 is to continue running on the camera subsystem 118 in response to the camera subsystem 118 identifying the tear in the net during the operation of the net inspection mode 142. In this manner, the goal of the feeding decision making mode 138 can still be achieved after the net of the enclosure 123 has been inspected. After the net inspection mode 142 ceases, the scheduler 130 can start the feeding decision making mode 138 back to a point where it was previously ceased and continue to operate this mode until its one or more goals are met.

Each mode of the smart mode selection system 101 requires various configurations. These configurations can include, for example, setting the camera subsystem 118 to a specific location in the enclosure 123, setting and/or adjusting the cord 109 of the winch subsystem 114, adjusting an angle of the camera subsystem 118, setting the exposure of the camera subsystem 118, setting the brightness of lighting subsystem, e.g., setting brightness of LEDs of the lighting subsystem, and engaging or disengaging the feeder 120, to name some examples. For example, in the sea lice detection mode 134, the camera subsystem 118 is placed in a particular location and angled in a particular manner within the enclosure 123, the winch subsystem 114 is adjusted to move with movements of the aquatic livestock 122, and the lighting subsystem is dimmed to better see the lice on the fish. In the biomass detection mode 136, the camera subsystem 118 is placed in a particular location and angled in a particular manner within the enclosure 123, the winch subsystem 114 is adjusted to move with movements of the aquatic livestock 122, and the lighting subsystem is adjusted to a bright light to see biomass estimates of the aquatic livestock 122. In the feeding decision making mode 138, the camera subsystem 118 is placed in a particular location and angled in a particular manner within the enclosure 123 proximate to the feed from the feeder 120, the winch subsystem 114 moves the camera subsystem 118 towards the feed of feeder 120, and the lighting subsystem is adjusted to a bright light to see biomass estimates of the aquatic livestock 122. Each of these settings can be different for each of the different modes. The various limited-hardware dependent modes 140 do not require the use of the winch subsystem 114 and the lighting subsystem.

In some implementations, the scheduler 130 can analyze costs associated with switching between different modes. As previously described, each mode can include a specific configuration of the winch subsystem 114, the camera subsystem 118, the lighting subsystem, and the feeder system. The costs associated with switching between modes can include, for example, ramp up times, ramp down times, moving locations, re-programming the camera subsystem 118, and communications between the remote server 102 and the camera subsystem 118. For example, the sea lice detection mode 134 and the biomass detection mode 136 can include different configurations. Specifically, the lighting configurations between the two modes can be different, e.g., the former requiring dimmer light than the latter. To switch from the sea lice detection mode 134 to the biomass detection mode 136 requires changing various parameters of the lighting subsystem, such as brightness, color, or frequency. However, the lighting subsystem can be brightened at a slow pace because an abrupt change in the brightness of the lighting subsystem can scare the aquatic livestock 122. For example, the lighting subsystem may require one hour of time to brighten for the biomass detection mode 136. In this case, the scheduler 130 can assign a high cost of switching modes to the biomass detection mode 136.

In another example, a high cost can also exist when the camera subsystem 118 switches from the biomass detection mode 136 to the feeding decision making mode 138. In the feeding decision making mode 138, the feeder 120 becomes engaged and the winch subsystem 114 can move the camera subsystem 118 to a location proximate to the feeder 120 for monitoring the aquatic livestock 122. This movement can take time, e.g., 30 minutes or more, for example. As such, the scheduler 130 can assign a high cost with switching to the feeding decision making mode 138.

In another example, a low cost can also exist when the camera subsystem 118 switches from the feeding decision making mode 138 to the biomass detection mode 136. In the biomass detection mode 136, the camera subsystem 118 does not need to move far from the feeder 120 for monitoring the aquatic livestock 122. As such, this movement can take a small amount of time, e.g., 5 minutes or less, for example. Therefore, the scheduler 130 can assign a low cost witch switching to the biomass detection mode 136 from the feeding decision making mode 138.

In some implementations, switching to the one or more limited-hardware dependent modes 140 requires a low cost. The limited-hardware dependent modes do not require the use of the winch subsystem 114, the lighting subsystem, and the feeder 120. As such, the scheduler 130 can assign a low cost associated with switching to one or more modes of the limited-hardware dependent modes. In another example, the scheduler 130 can execute a park mode. In the park mode, the scheduler 130 can set the camera subsystem 118 in its current spot. Moreover, during the park mode, the scheduler 130 can place the camera subsystem 118 in a current spot to take control of the hardware or to manage the current environmental conditions. For example, if the camera subsystem 118 is currently facing strong wind conditions, then the scheduler 130 may assign the camera subsystem 118 to be in park mode, which is a low powered mode, so the camera subsystem 118 is not in use during this time period of turbulent weather conditions.

In some implementations, the scheduler 130 can assign a cost value to each of the modes. The cost value can be, for example, a weight value, a percentage, a number, or another number that represents a cost against switching to the mode. In some examples, the scheduler 130 can provide the cost value to the trained machine-learning models for each of the modes when generating output likelihoods for each mode. The trained machine-learning models can weigh each of the inputs against their cost values to produce output likelihoods for each of the modes.

Figure 1C:
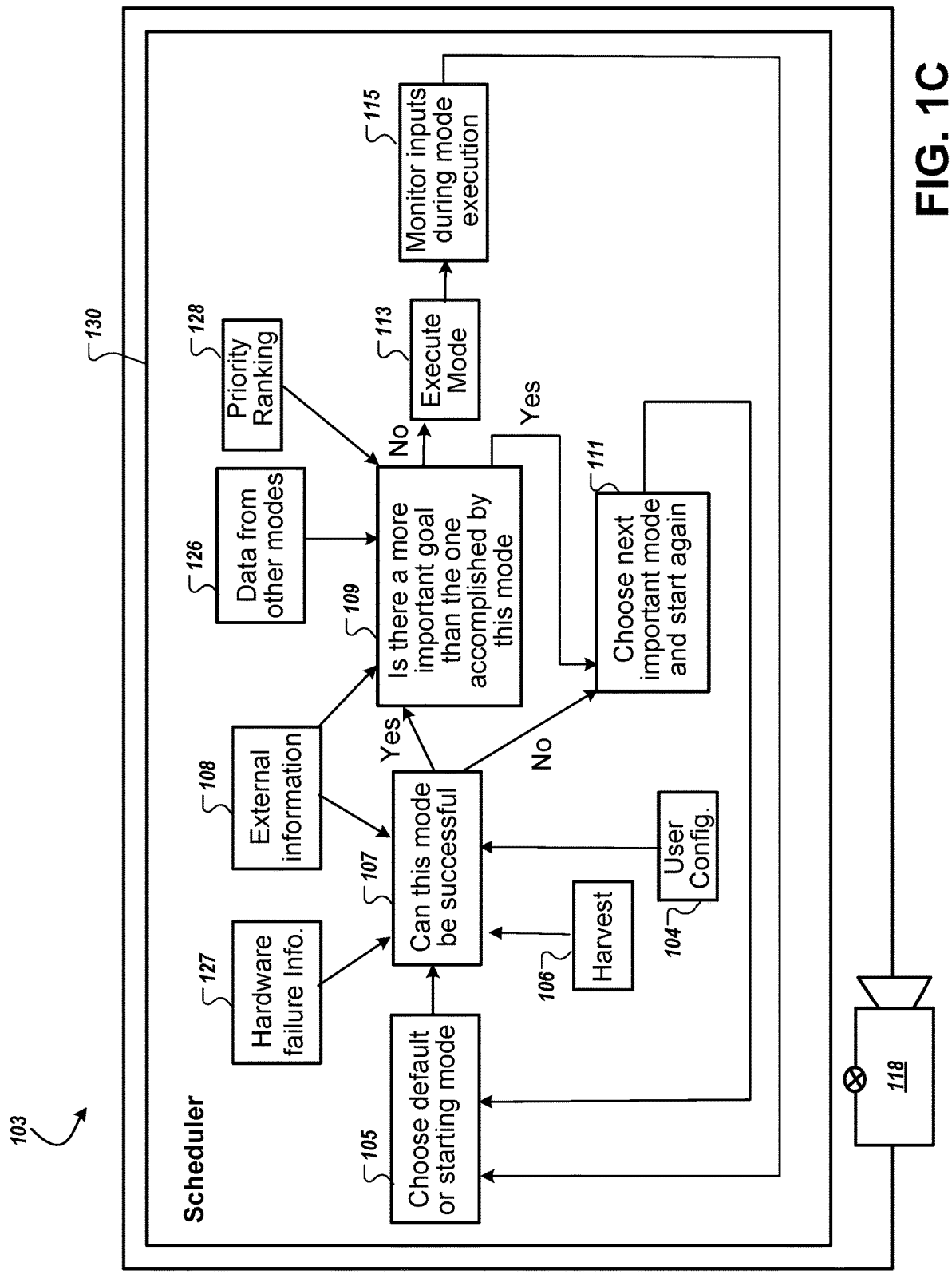
FIG. 1C is a diagram that illustrates an example system for selecting a mode for a camera to operate when observing aquaculture in an enclosure.

FIG. 1C is a diagram that illustrates an example system 103 for selecting a mode for a camera to operate when observing aquaculture in an enclosure. The system 103 illustrates the process performed by the scheduler 130 of the smart mode selection systems 100 and 101. System 103 also illustrates similar components and functionality described with respect to systems 100 and 101.

During 105, the scheduler 130 can choose a default or starting mode to operate the camera subsystem 118. The default or starting mode can be a mode selected based on a schedule received from the remote server 102 or a schedule generated by the scheduler 130. For example, the scheduler 130 can receive user configuration 104 that signifies a starting mode for the camera subsystem 118. In another example, the scheduler 130 can select a starting mode for operating the camera subsystem 118 based on current a time and a day. The scheduler 130 can identify a mode from a generated schedule and determine that mode as the starting mode. This mode can be a sea lice detection mode, for example, which seeks to identify a ratio of lice per fish for a set number of fish.

During 107, the scheduler 130 can determine whether the selected mode can be successful. In some implementations, the scheduler 130 can determine whether the selected mode is likely to be successful based on external information. The external information can present a view of the inputs or present a view of the environment of the smart mode selection systems 100 and 101. For example, the scheduler 130 can obtain hardware failure information 127, external data 108, harvest information 106, and user configuration 104. The scheduler 130 can obtain inputs related to the user configuration 104, the harvest information 106, the external data 108, a current mode of the camera subsystem 118, and other previously mentioned data, to output an indication of how likely each of the one or more modes would be successful in executing on the camera subsystem 118. The other previously mentioned data can include, for example, power availability data, connectivity data, data indicating presence of foreign fish, data indicative of fish behavior, research priorities, data indicating knowledge about diseases or environmental factors on nearby farms, results from other modes, and data indicating distribution of fish in the enclosure 123.

The scheduler 130 can provide each of these data inputs to the trained machine-learning models to generate output likelihoods. The trained machine-learning model can be configured to analyze each of the different input values, weigh their values, and determine output likelihoods for modes on the camera subsystem 118. For example, the trained machine-learning model can analyze the ambient light information. The trained machine-learning model can identify one or more of the biomass detection mode, the feeding mode, and the net inspection mode when ambient light is available, such as during the daytime. Alternatively, the trained machine-learning model can identify the sea lice detection mode when minimum ambient light is available, such as during an overcast of clouds or during the nighttime.

The trained machine-learning model can analyze the power availability information. For example, the trained machine-learning model can identify a mode with low power constraints, e.g., a biomass detection mode without the lighting subsystem, when power availability is deemed to be low. Power may be low when the camera subsystem 118 is located in remote locations when power is not consistently available or can be intermittent. In another example, the trained machine-learning model can identify that the camera subsystem 118 should turn off in the case that power is intermittent. In this example, a mechanic or another reviewer of the systems 100 and 101 can spend time charging a battery of the camera subsystem 118 instead of executing a mode that may fail due to intermittent power.

The trained machine-learning model can also analyze the connectivity information. The trained machine-learning model can be configured to identify a mode that records raw images in the case that high connectivity, e.g., high bandwidth and throughput, is identified. On the other hand, if the trained machine-learning model identifies that connectivity is poor, e.g., low bandwidth and throughput, then the trained machine-learning model can identify a mode that is successful with lower connectivity. A mode that is successful with lower connectivity can include a mode that does not need to transmit data, or transmit very limited data, e.g., transmitting "yes" or "no" every second requires less connectivity than transmitting an image every second. If there is low connectivity but there is sufficient memory available on the device, the scheduler may also choose to save data in memory for later processing.

The trained machine-learning model can also analyze the presence of foreign fish information. For example, if the input data indicates that non-salmon fish are detected in the enclosure, then this information can infer that there may be a hole or tear in the net of the enclosure 123 exists. Non-salmon fish can include fish such as, for example, cod fish, mackerel, sharks, etc. In this case, the trained machine-learning model can identify a net-inspection mode to execute on the camera subsystem 118 to confirm whether a tear in fact exists in the net. However, the trained machine-learning mode can also take into account historical information regarding this input. For example, if the net-inspection mode had been previously performed within a prior predetermined time period, e.g., within the past five days, then the trained machine-learning model may identify another mode. Additionally, in this scenario, the trained machine-learning model can identify the net inspection mode as long as the ambient light level is sufficient for the mode to be successful. This is because the camera subsystem 118 can see farther in the water column in the enclosure 123 during the daytime and ultimately, view more of the net of the enclosure 123 at once. If it is dark outside and there is not enough light available, the scheduler may choose a mode that is more likely to be successful in darkness.

The trained machine-learning model can analyze the fish behavior information. For example, the aquatic livestock may feed with the feeder 120 at certain times throughout the day. In this case, the trained machine-learning model can be configured to execute the feeding mode during these certain times of the day. In this case, if the trained machine-learning model identifies that a current time or an upcoming time corresponds to a feeding time, then the trained machine-learning model can identify the feeding mode as the mode to execute on the camera subsystem 118. In some implementations, the scheduler 130 can determine feeding time based on a time when the feeder 120 is activated. The scheduler 130 may store these times, and use these times as training data for the trained machine-learning model. In some implementations, the scheduler 130 can also determine feeding time based on the camera subsystem 118 detecting frenzied feeding behavior in the scene. In some implementations, a human reviewing a monitor at the remote server 102 can detect frenzied feeding behavior in the scene.

In some examples, the trained machine-learning model can decide that feeding mode would not be successful based on weather information. For example, if the weather information indicates that wind is high, wave height and length are tall and long, respectively, then the trained machine-learning can decide against selecting the feeding mode because the fish food pellets would not successful be found by the fish. In another example, if the scheduler 130 receives information that indicates the turbidity of the water is too high, then the trained machine-learning model can decide against selecting the feeding mode because of the difficulty with seeing the food pellets and to perform the biomass detection instead.

The trained machine-learning model can analyze inputs related to opportunities for disease treatments. For example, the scheduler 130 may receive an indication that a treatment ship is nearby. This indication may be received in the user configuration 104 and supplied by a user interacting with the remote server 102. In some cases, the remote server 102 may detect a closeness of the lice treatment ship. The remote server 102 can detect the closeness using RADAR or receive communication from the lice treatment ship itself. In response, the remote server 102 can provide data to the scheduler 130 indicating the lice treatment ship is close to the enclosure 123. The trained machine-learning model can identify the sea lice detection mode when the input indicates a lice treatment ship is nearby. This is because a fish farmer may desire the camera subsystem 118 to spend extra time determining fish to lice estimates when a lice treatment ship is nearby. In this case, the trained machine-learning model can identify the sea lice detection mode so the camera subsystem 118 devotes more resources to running this mode.

The trained machine-learning model can analyze inputs related to the harvest schedule 106. For example, if the trained machine-learning model receives information indicating that an upcoming harvest is pending, then the trained machine-learning model can select a biomass detection mode to estimate the biomass of fish that are soon to be harvested. This is because if fish are near the size or point in their life where a farmer is deciding to harvest the fish, then the farmer and a fish sales individual may be keen to know the fish's biomass than other times during the fish's lifecycle.

The trained machine-learning model can analyze inputs related to the research priorities. For example, the trained machine-learning model can receive an indicating that the enclosure 123 has been marked as one for ongoing research. The scheduler 130 can receive an indication from the remote server 102 that indicates this specific camera subsystem 118 is being used for specific research. The specific research can be related to, for example, conducting trials on sea lice removal techniques or fish genetics. In this case, the marking can signify to the trained machine-learning model that more time should be given to the sea lice detection mode in order to obtain more precise numbers, even if other modes receive less time. In this case, the trained machine-learning model can select the sea lice detection mode.

The trained machine-learning model can analyze inputs related to knowledge about disease or environmental factors on nearby farms. In some cases, there may be rare diseases that a fish farmer may not typically measure. However, if a fish farmer hears or receives notice that a nearby farm has had an infestation, then that fish farmer may be willing to spend a certain amount of time searching for that particular disease in the enclosure 123, so early action can be taken. The farmer or an automatic system can interact with the remote server 102 to send a notification to the scheduler 130 that a potential disease has been identified and to search for that disease. In response, the scheduler 130 can notify the trained machine-learning model that a disease has been identified and to run a mode that detects that certain disease. The scheduler 130 can therefore receive disease reports from nearby fish farms, which are sometimes made available publically government reporting agencies, to decide which mode to run. For example, the scheduler 130 can identify indicators of the disease, such as visual defects, swimming speed, direction, or changes in biomass or color. In some implementations, the scheduler 130 can include one or more trained machine-learning models to perform processes related to mode selection and mode monitoring.

The trained machine-learning model can also analyze inputs from other modes. In some cases, the camera subsystem 118 may execute the biomass detection mode for a desired period of time. However, the camera subsystem 118 may not have observed a sufficient amount of fish to meet the goal of the biomass detection mode. Alternatively, when the camera subsystem 118 executed the sea lice detection mode, the goal of the sea lice detection mode was met because a sufficient number of fish had been observed. In this case, the trained machine-learning model or scheduler 130 can determine to execute the biomass detection mode for more time than the sea lice detection mode, for example, to meet the goal of the biomass detection mode.

The trained machine-learning model can analyze inputs related to the distribution of fish. Typically, the scheduler 130 can analyze fish count, which provides a generalized understanding of how the model of the biomass detection mode is performing on the camera subsystem 118. Based on this, the scheduler 130 can obtain a minimum distribution regarding characteristics of the aquatic livestock 122 in the enclosure 123. This may be helpful for analyzing the type of aquatic livestock 122 found in the enclosure 123, which farmers can use as selling points for fish salesmen.

The trained machine-learning model can analyze inputs related to the hardware failure information 127. For example, if the LED lights of the camera subsystem 118 are not working properly, then the scheduler 130 or trained machine-learning model can run modes that do not require the use of the LED lights. Specifically, the scheduler 130 or trained machine-learning models can select modes such as the sea lice detection mode that do not require the LED lights until the LED lights are properly working again. In another example, the winch subsystem 114 is unable to move due to a winch alarm or mechanical failure, and then the trained machine-learning model can determine which mode to execute effectively given the location of the camera subsystem 118, without biasing the results, due to not having an accurate depth sample. For example, the trained machine-learning model can select simulation mode or fish feeding mode, to name a few examples.

In some implementations, the scheduler 130 can automatically determine runtimes for each mode that maximize performance on the goals for each mode. Specifically, the scheduler 130 can analyze historical data over prior periods to determine on average a length of time taken for each mode. The scheduler 130 can determine based on the historical data an average length of time for each mode to reach its respective goal. The scheduler 130 can also factor in priority information that may adjust the average length of time for each mode to reach its respective goal. Based on the average length of time for each mode, the scheduler 130 can generate a schedule for each mode and indicate each mode run for a respective amount of time using the average length of time for each mode. The scheduler 130 may adjust the schedule every day, every hour, every minute, or any interval.

During 109, the scheduler 130 can analyze the output likelihoods from the trained machine-learning models. The trained machine-learning models can output a likelihood for each mode that represents a likelihood that that mode should run on the camera subsystem 118 successfully. The scheduler 130 can then compare the output likelihoods to a threshold value. If the output likelihoods do not satisfy the threshold value, then the scheduler 130 can discard the mode. If the output likelihoods do satisfy the threshold value, then the scheduler 130 can determine from the modes whose output likelihoods satisfy the threshold value, which modes should execute on the camera subsystem 118. Subsequently, the scheduler 130 can analyze the output from a mode's execution to determine whether the mode should continue running or a different mode should be running on the camera subsystem 118.

Specifically, if two or more modes whose outputs satisfy the threshold values cannot run concurrently because they require the same hardware dependencies, then the scheduler 130 can select the mode with the highest priority ranking information based on the priority ranking 128. If two or more limited-hardware dependent modes have outputs that satisfy the threshold value, then the scheduler 130 can select each of the limited-hardware dependent modes for execution on the camera subsystem 118 because these modes can execute on the camera subsystem 118 in the background. If one or more hardware dependent modes and one or more limited-hardware dependent modes have outputs whose likelihoods satisfy the threshold value, then the camera subsystem 118 can select the mode to execute on the camera subsystem 118 that has the highest priority ranking 128. If the highest priority ranked mode is a limited-hardware dependent mode, then the scheduler 130 can determine if the next highest priority ranked mode is a hardware or limited-hardware dependent mode. If limited-hardware, then the scheduler 130 can select the limited-hardware dependent mode to execute along with the highest priority ranked limited-hardware dependent mode. This process iteratively repeats until a priority ranked hardware dependent mode is found. If the highest priority ranked mode is a hardware dependent mode, then that mode is selected to be executed on the camera subsystem 118.

In some cases, the scheduler 130 can analyze the goals of each of the modes whose output likelihood satisfies the threshold values. The scheduler 130 can determine which of the goals have the highest importance. The highest importance can be ranked based on priority ranking 128, for example. In some examples, the scheduler 130 can select the mode whose goal is near completion but had to cease previously due to a more impending mode. In some examples, the scheduler 130 can select the mode whose goal is of priority importance based on instruction received from the remote server 102, such as by way of the fish farmer. In some examples, the scheduler 130 can analyze the default mode and determine whether the default mode has the highest importance.

Generally, the scheduler 130 can stack or rank each based on importance using the priority data. For example, if a lice treatment ship is near, the scheduler 130 can determine it is cheaper to perform lice treatment while the lice treatment ship is near than after it leaves, and thus, important for the scheduler 130 to determine lice levels per fish while the lice treatment ship is near. In this case, the goal of lice estimation per fish may be ranked higher than the goal for another mode. In another example, if the scheduler 130 determines a harvest is impending, then the closeness of a lice treatment ship is no longer important because the fish may be harvested before the lice treatment ship treats them. However, the scheduler 130 can select a biomass detection mode would be of high importance for the harvest, because the fish sales team can decide how to proceed regarding the selling of harvested fish.

During 111, if the scheduler 130 determines that the default mode is not of the highest importance, then the scheduler 130 can return 105 and return to a different mode. In some cases, the scheduler 130 can discard each of the modes if none of the output likelihoods satisfy the threshold value and start over by returning to 105.

During 113, if the scheduler 130 determines that at least one of the modes exceeds the threshold value, then the scheduler 130 can execute the mode on the camera subsystem 118. Specifically, the scheduler 130 can retrieve the model associated with the mode, or models associated with each of the modes, and execute the mode or modes on the camera subsystem 118. The scheduler 130 can load the model or models in the cache memory or memory of the camera subsystem 118 and instantiate operation of the model or modes.

During 115, the scheduler 130 can continue to monitor the inputs during the execution of the mode or modes currently executing on the camera subsystem 118. Specifically, the scheduler 130 can repetitively or continuously perform the processes related to 105, 107, 109, 111, 113, and 115 in an iterative fashion while the current mode executes on the camera subsystem 118. In this manner, the scheduler 130 can adjust any currently executing modes on the camera subsystem 118 if the processes identify those different modes that should be executing on the camera subsystem 118.

In some implementations, the scheduler 130 can operate in an autonomy mode. In the autonomy mode, the scheduler 130 can start execution of the camera subsystem 118 using the default schedule. Then, the scheduler 130 can autonomously adjust the default schedule to executing one or more modes based on the inputs presented to the scheduler 130. In this manner, a benefit exists with this system in that the scheduler 130 can independently execute the camera subsystem with various different modes by attempting to meet the one or more goals associated with each mode. The scheduler 130 can also attempt to retrain its trained machine-learning models based on one or more modes that do not meet their desired goals.

Figure 1D:
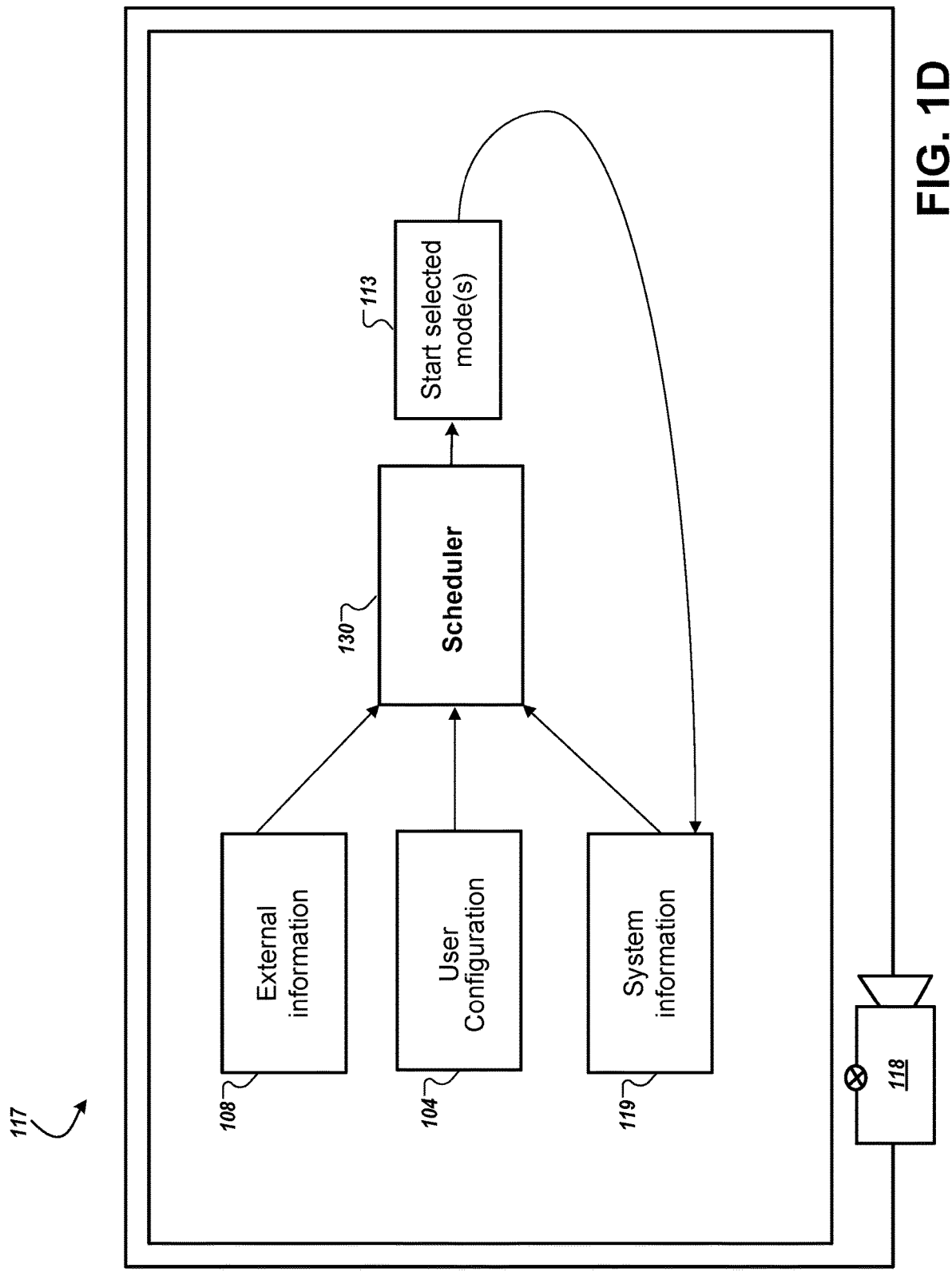
FIG. 1D is another diagram that illustrates an example system for selecting a mode for a camera to operate when observing aquaculture in an enclosure.

FIG. 1D is another diagram that illustrates an example system 117 for selecting a mode for a camera to operate when observing aquaculture in an enclosure. The system 117 is similar to system 103, and includes processes performed by the scheduler 130 of the smart mode selection systems 100 and 101. Moreover, the system 117 illustrates the processes performed by the camera subsystem 118, which houses the scheduler 130.

In some implementations, the scheduler 130 can include one or more trained machine-learning models. These trained machine-learning models can be configured to produce one or more outputs regarding modes to execute successfully on the camera subsystem 118. The trained machine-learning models can receive inputs such as, for example, the external data 108, the user configuration 104, and system information 119. The system information 119 can include the harvest information 106, hardware failure information 127, a current mode of the camera subsystem 118, and other data.

The trained machine-learning models of the scheduler 130 can output an indication or likelihood of how likely each of the one or more modes would be successful if currently executed on the camera subsystem 118. The scheduler 130 can then compare the output likelihood for each of the modes to a threshold value. The scheduler 130 can then decide which of the modes to execute on the camera subsystem 118 based on the output likelihoods that satisfy the threshold value. The scheduler 130 can also analyze other criteria to determine whether to stop a current mode, add another mode on the camera subsystem 118 to execute, or stop all modes currently executing and start another mode to execute, to name a few examples. As shown in 113, the scheduler 130 can execute one or more modes to run based on their corresponding output likelihoods satisfying the threshold value. Other examples are also possible.

In response to starting and executing the one or more modes, the scheduler 130 can analyze the output from each of the currently executing modes as system information 119. This information can aid the scheduler 130 in determining how the currently executing modes are progressing towards their respective goals, whether other modes should be running in addition to or in replace of the currently executing modes, and monitoring a status of the camera subsystem 118. The scheduler 130 can perform this process on an iterative or repetitive basis to ensure the optimal modes are the modes currently executing on the camera subsystem 118. The optimal modes can be the one or more modes that have a maximum potential for successfully meeting their goals depending on the current context of the camera subsystem 118.

FIG. 2A is a diagram that illustrates an example of a schedule 200 for camera operating modes. The schedule 200 illustrates a schedule for executing one or more modes on the camera subsystem, such as camera subsystem 118. Other schedules are also possible.

Specifically, the schedule can be received from the remote server in the user configuration information. As illustrated in the schedule 200, on day 1, mode 1 can execute for the first six hours, mode 2 can execute for the next four hours, mode 3 can execute for the next one hour, mode 2 can execute for the next one hour, mode 3 can execute again for the next 1 hour, mode 2 and mode 4 can execute for one hour simultaneously, and mode 1 can execute for the final 6 hours of the day. In some cases, when modes execute in parallel with other modes, the camera subsystem 118 can run the modes slower than if a mode was running alone. In some cases, a mode only needs to be run once a week, twice a week, or longer. The schedule can also include modes specified by hours for the next day, two days, week, month, and even longer. The schedule can also be adjusted at any time to stop one or more modes or start one or more modes.

Figure 2B:
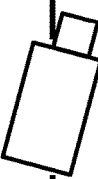
FIG. 2B is another diagram that illustrates an example of a schedule for camera operating modes.

FIG. 2B is another diagram that illustrates an example of a schedule 201 for camera operating modes. Specifically, the schedule 201 can be a schedule generated by the scheduler 130. The scheduler can forecast the modes to be executed on the camera subsystem over a specific time period in the future, e.g., one day, two days, a week, or greater. Additionally, the schedule 201 can include modes that have been adjusted by the scheduler during real time monitoring of the received inputs. Other exemplary generated and adjusted schedules are also possible.

As illustrated in the schedule 201, on day 1, the scheduler determined that mode 2 was not available between hours 0 to 10 due to a hardware outage. To avoid wasted time, the scheduler executed mode 1 in the time slot where mode 2 would have executed. Then, on day 1, the scheduler executed mode 2 in the afternoon from hours 16-18, and then on day 2, the scheduler allocated more time for mode 2 to make up for the lost time on day 1 and to take up time out of mode 1, which was already ahead of its goal. In addition, to let mode 2 catch up to its goal after the hardware outage, on day 2, the scheduler enabled mode 2 to run faster in the afternoon by executing on the camera subsystem on its own instead of simultaneously with mode 4, as shown on day 1 between 16-18 hours. On day 6, the scheduler increased mode 5's importance ranking and executed mode 5 on day 6 and day 7 in an extended timeframe to reach its goal. Other examples are also possible.

FIG. 3 is a flow diagram that illustrates an example of a process 300 for selecting a mode for a camera to operate when observing aquaculture. The process 300 can be performed by the scheduler 130 of a camera subsystem.

During (302), a scheduler of an underwater camera can, repeatedly, obtain data indicative of a current context of the underwater camera. The scheduler can obtain a plethora of information regarding the current context of the underwater camera. The information can include, for example, data indicative of ambient light, data indicative of power availability, obtaining power availability of the underwater camera, and obtaining data indicative of connectivity between the underwater camera and a remote server. The information can also include other data, such as, obtaining data indicative of foreign fish present in a fish pen that is proximate to a location of the underwater camera; obtaining data indicative of opportunities for disease treatment of one or more fish being monitored, and obtaining data indicative of harvest schedules for harvesting the fish.

In some implementations, the scheduler repeatedly performs the processes related to (302) through (314). Specifically, the scheduler can perform each of the processes related to (302) through (314) while the underwater camera remains active, on, or otherwise in a state operating one or more of the modes. The scheduler can perform each of these processes in an iterative or repetitive manner.

The scheduler can also obtain research priority information, data indicative of one or more of diseases and environmental factors of one or more other nearby fish farms, data indicative of results of one or more other modes currently run on the underwater camera, data indicative of fish distribution in the fish pen, and data indicative of hardware status or maintenance associated with the underwater camera. The scheduler can obtain this information on a periodic basis, e.g., every minute, every hour, every twenty-four hours, every two days, and so on. Additionally or alternatively, the scheduler can obtain this information when these data values change or when the data is pushed to the underwater camera by an external device. The scheduler can also obtain this data in other manners as well.

During (304), the scheduler can determine whether the current context of the underwater camera satisfies one or more first criteria associated with continued activation of one or more modes that are currently activated on the underwater camera. Specifically, the scheduler can identify first criteria associated with one or more modes that are currently activated that defines whether the underwater camera should activate the one or more modes. For example, the first criteria can define a time of day, a temperature, an indication from a schedule, and other information that defines whether the one or more currently activated should be activated.

In response to defining first criteria, the scheduler can analyze each of the data components identified in (302). This can include identifying, for example, values of each of these data components, data value ranges, and other examples. Then, the scheduler can determine a likelihood for each mode of the one or more modes that indicates whether the one or modes should be active and whether the one or more modes would be successful if active. For example, the scheduler can provide the data values for each of the identified data components above to the one or more trained machine-learning models. The trained machine-learning models can output a likelihood for each mode that represents whether that mode should run on the camera subsystem 118 based on how successful that mode will be in reaching its goals. For example, the trained machine-learning model can output a 25% likelihood for the sea lice detection mode, a 55% likelihood for the biomass detection mode, a 42% likelihood for the feed mass decision making mode, a 10% likelihood for the net inspection mode, a 91% likelihood for the recording decision mode, and percent likelihoods for each of the other modes.

In response to outputting likelihoods for each of the modes, the scheduler can compare the likelihoods for each of the modes to a threshold value. The scheduler can then determine which of the output likelihoods satisfy the threshold value. The output likelihoods can satisfy the threshold value by meeting or exceeding the threshold value. If the scheduler determines that the one or more currently active modes are the modes whose output likelihoods satisfy the threshold value, then the scheduler can ensure these modes continue to remain active. Additionally, the scheduler can determine the other modes who are not active have output likelihoods that do not satisfy the threshold value are to remain inactive.

During (306), the scheduler can determine whether the current context of the underwater camera satisfies one or more second criteria associated with activation of one or more modes that are not currently activated on the underwater camera. Specifically, the scheduler can identify second criteria associated with one or more modes that are currently inactive that defines whether the scheduler should activate one or more of the currently inactive modes. The scheduler can then identify and analyze the one or more data components identified in (302). Then, the scheduler can determine a likelihood for each mode of the one or more modes that indicates whether the one or modes should be active and whether the one or more modes would be successful if active. In response, the scheduler can compare the output likelihoods for each of the modes to a threshold value. If the scheduler determines that the output likelihoods of the one or more of the currently inactive modes satisfy the threshold value, then the scheduler can determine that the one or more currently inactive modes should be active. Alternatively, if the scheduler determines that the output likelihoods of the one or more of the currently inactive modes do not satisfy the threshold value, then the scheduler can determine that the one or more currently inactive modes should remain inactive.

During (308), the scheduler can select one or more modes to be active based on (i) determining whether the current context of the underwater camera satisfies the one or more first criteria and (ii) determining whether the current context of the underwater camera satisfies the one or more second criteria. The scheduler can take a variety of actions regarding activating and/or inactivating various modes. For example, the scheduler can identify a set of modes that are currently active to continue remaining active based on the output likelihoods generated by the trained machine-learning models. In some examples, the scheduler can identify one or more of the modes that are currently active to transition to being inactive, while keeping some of the modes active. In some examples, the scheduler can identify one or more of the inactive modes to transition to being active. In some examples, the scheduler can identify one or more of the inactive modes to remain inactive.

During (310), the scheduler can cause the one or modes to be active on the underwater camera. This can include either activating or deactivating a number of modes. In some examples, the scheduler can identify and retrieve a model, such as a trained machine-learning model, associated with a mode to be active and load that model into the memory of the camera subsystem 118. The scheduler may transmit a request to a remote server for the model of the mode or access the model of the mode to be active on an external database, to name a few examples.

During (312), the scheduler can activate one of the one or more modes that are to be active and that are not currently activated on the underwater camera. For example, the scheduler can activate any of the one or more modes that are currently inactive on the underwater camera. In some examples, the scheduler can maintain activation of a set of modes of the one or more modes that are currently active on the underwater camera.

During (314), the scheduler can deactivate any of the one or more modes that are currently activated on the underwater camera that are not included in the one or more that are to be activated. For example, the scheduler can deactivate any of the one or more modes that are currently active on the underwater camera. In some examples, the scheduler can maintain inactivation of any of the one or more modes that are currently inactive.

In some implementations, the scheduler can activate any of the one or more modes by activating a model of the one or more modes to be active. Activating a model of the one or more modes includes executing the corresponding model on the underwater camera. Similarly, deactivating a model of the one or more modes can include stopping the execution of the model and/or removing the corresponding model from memory of the underwater camera.

In some implementations, the scheduler can assign one or more goals to each of the one or more modes. The scheduler can assign a goal to a mode before the mode is executed on the underwater camera. A goal can include one or more criteria that define tasks for the underwater camera to complete when the corresponding mode is active on the underwater camera. For example, for the mode of sea lice detection, one goal can include defining a ratio of lice per fish for one hundred fish. For the mode of biomass estimation, one goal can include defining an average weight for one hundred fish identified in the enclosure. Other goals are also possible. Additionally, each mode can include one or more goals defined by the scheduler. In some cases, the one or more goals can be defined by a remote user interacting with the remote server and provided to the scheduler.

In some implementations, the scheduler can monitor a completion for each of the one or more goals for each of the one or more modes. As the underwater camera performs processes for each of the one or more modes, the scheduler can track each goal's completion status. For example, for the biomass detection mode in which one hundred are required to be measured, the scheduler can determine that thirty more fish need to be analyzed based on a current number of fish analyzed over a set period of time. In this case, the scheduler can determine that the biomass detection mode is 70% complete.

In some examples, the scheduler can determine that the net inspection mode is 100% complete based on a determination that the underwater camera has scanned the entirety of the enclosure. This case, the scheduler can compare the percent completion to a threshold value, e.g., 90%, to determine that the net inspection mode should be switched to inactive based on its completion. In this case, the scheduler can enable other modes to run to reach their set goals. However, if the net inspection mode was determined to be 30%, then the scheduler can enable the net inspection mode to continue to operate on the underwater camera. The scheduler can monitor each mode's goal completion and determine which mode to execute on the underwater camera based on a current status of the underwater camera and a completion of one or more goals of the corresponding mode.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   repeatedly, by a scheduler of an underwater camera:
   obtaining data indicative of a current context of an underwater camera;
   determining whether the current context of the underwater camera satisfies one or more first criteria associated with continued activation of one or more computational modes that are currently activated on the underwater camera, wherein the one or more computational modes each include a different set of one or more data processing operations;
   determining whether the current context of the underwater camera satisfies one or more second criteria associated with activation of one or more computational modes that are not currently activated on the underwater camera;
   selecting one or more computational modes to be active based on (i) determining whether the current context of the underwater camera satisfies the one or more first criteria and (ii) determining whether the current context of the underwater camera satisfies the one or more second criteria; and
   causing the one or more computational modes to be active on the underwater camera, comprising:
   activating any of the one or more computational modes that are to be active and that are not currently activated on the underwater camera, or
   deactivating any of the one or more computational modes that are currently activated on the underwater camera that are not included in the one or more computational modes that are to be activated,
   wherein the one or more computational modes comprises hardware computational modes and computational modes that require limited hardware, the hardware computational modes comprising sea lice detection, biomass detection, and feeding decision making, and the computational modes that require limited hardware comprising net inspection and recording decision making.

2. The computer-implemented method of claim 1, wherein obtaining the data indicative of the current context of the underwater camera further comprises:
   obtaining data indicative of ambient light;
   obtaining data indicative of power availability;
   obtaining power availability of the underwater camera;
   obtaining data indicative of connectivity between the underwater camera and a remote server;
   obtaining data indicative of foreign fish presence in a fish pen that is proximate to a location of the underwater camera;
   obtaining data indicative of opportunities for disease treatment of one or more fish being monitored;
   obtaining data indicative of harvest schedules for harvesting the fish;
   obtaining data indicative of research priorities;
   obtaining data indicative of one or more of diseases and environmental factors of one or more other nearby fish farms;
   obtaining data indicative of results of one or more other computational modes currently run on the underwater camera;
   obtaining data indicative of fish distribution in the fish pen; and
   obtaining data indicative of hardware status or maintenance associated with the underwater camera.

3. The computer-implemented method of claim 2, wherein determining whether the current context of the underwater camera satisfies the one or more first criteria associated with continued activation of the one or more computational modes that are currently activated on the underwater camera further comprises:
   identifying the one or more first criteria associated with the one or more computational modes that are currently activated that defines whether the underwater camera should activate the one or more computational modes;
   analyzing one or more of the data indicative of ambient light, the data indicative of power availability, the power availability of the underwater camera, the data indicative of connectivity, the data indicative of foreign fish presence, the data indicative of opportunities for disease treatment, the data indicative of harvest schedules, the data indicative of research priorities, the data indicative of one or more of diseases and environmental factors, the data indicative of results of one or more other computational modes, the data indicative of fish distribution in the fish pen, and the data indicative of hardware status or maintenance associated with the underwater camera, against the first criteria corresponding to each of the one or more computational modes currently active of the underwater camera;
   in response to analyzing the data indicative of the current context of the underwater camera against the one or more first criteria of the currently active computational modes, determining a likelihood for each mode of the one or more computational modes that indicates whether the one or more computational modes should be active;
   comparing the likelihood for each mode of the one or more computational modes to a threshold value; and
   in response to determining that a first subset of one or more computational modes that are currently active satisfies the threshold value, determining the first subset of the one or more computational modes are to continue being active; or
   in response to determining that a second subset of one or more computational modes that are currently active do not satisfy the threshold value, determining the second subset of the one or more computational modes are to be inactive.

4. The computer-implemented method of claim 3, wherein determining whether the current context of the underwater camera satisfies the one or more second criteria associated with activation of the one or more computational modes that are not currently activated on the underwater camera further comprises:

identifying the one or more second criteria associated with the one or more computational modes that are currently inactive that defines whether the underwater camera should activate the one or more computational modes;

analyzing one or more of the data indicative of ambient light, the data indicative of power availability, the power availability of the underwater camera, the data indicative of connectivity, the data indicative of foreign fish presence, the data indicative of opportunities for disease treatment, the data indicative of harvest schedules, the data indicative of research priorities, the data indicative of one or more of diseases and environmental factors, the data indicative of results of one or more other computational modes, the data indicative of fish distribution in the fish pen, and the data indicative of hardware status or maintenance associated with the underwater camera, against the second criteria corresponding to each of the one or more computational modes currently inactive of the underwater camera;

in response to analyzing the data indicative of the current context of the underwater camera against the one or more second criteria of the one or more computational modes currently inactive, determining a likelihood for each mode of the one or more computational modes that are currently inactive that indicates whether the one or more computational modes should be active;

comparing the likelihood for each mode of the one or more computational modes to a threshold value; and in response to determining that a third subset of one or more computational modes that are currently inactive satisfies the threshold value, determining the third subset of the one or more computational modes are to be active; or in response to determining that a fourth subset of one or more computational modes that are currently inactive do not satisfy the threshold value, determining the fourth subset of the one or more computational modes are to remain inactive.

5. The computer-implemented method of claim 4, wherein selecting the one or more computational modes to be active based on (i) determining whether the current context of the underwater camera satisfies the one or more first criteria and (ii) determining whether the current context of the underwater camera satisfies the one or more second criteria further comprises:

identifying the first subset of the one or more computational modes that are currently active to continue being active on the underwater camera; or identifying the second subset of the one or more computational modes that are currently active to transition to being inactive.

6. The computer-implemented method of claim 4, wherein selecting the one or more computational modes to be active based on (i) determining whether the current context of the underwater camera satisfies the one or more first criteria and (ii) determining whether the current context of the underwater camera satisfies the one or more second criteria further comprises:

identifying the third subset of the one or more computational modes that are currently inactive to transition to being active; or identifying the fourth subset of the one or more computational modes that are currently inactive to continue being inactive.

7. The computer-implemented method of claim 6, wherein activating any of the one or more computational modes that are to be active and that are not currently activated on the underwater camera further comprises:

activating the third subset of the one or more computational modes that are currently inactive on the underwater camera; and maintaining activation of the first subset of the one or more computational modes that are currently active on the underwater camera.

8. The computer-implemented method of claim 6, wherein deactivating any of the one or more computational modes that are currently activated on the underwater camera that are not included in the one or more computational modes that are to be activated further comprises:

deactivating the second subset of the one or more computational modes that are currently active on the underwater camera; and maintaining inactivation of the fourth subset of the one or more computational modes that are currently inactive.

9. The computer-implemented method of claim 1, further comprising assigning one or more goals to each of the one or more computational modes, wherein each goal of the one or more goals include one or more criteria that define tasks for the underwater camera to complete when the one or more computational modes are active.

10. The computer-implemented method of claim 9, further comprising:

monitoring a completion amount of each goal of the one or more goals corresponding to the one or more computational modes that are currently active on the underwater camera;

comparing the completion amount of each goal of the one or more goals to a threshold value; and in response to determining a subset of computational modes of the one or more computational modes satisfies the threshold value, determining that the subset of computational modes can be switched to inactive based on a completion of the subset computational modes for reaching their respective goals; or in response to determining a subset of computational modes of the one or more computational modes does not satisfy the threshold value, determining that the subset of computational modes continue to be active on the underwater camera while performing tasks for reaching their respective goals.

11. The computer-implemented method of claim 1, wherein one or more of the computational modes that require limited hardware can run on the underwater camera as a background process and one mode of the hardware computational modes can run on the underwater camera at a time.

12. A system comprising:

one or more computers and one or more storage devices storing instructions that are operable, when executed by the one or more computers, to cause the one or more computers to perform operations comprising:

repeatedly, by a scheduler of an underwater camera:

obtaining data indicative of a current context of an underwater camera;

determining whether the current context of the underwater camera satisfies one or more first criteria associated with continued activation of one or more computational modes that are currently activated on the underwater camera, wherein the one or more computational modes each include a different set of one or more data processing operations;

determining whether the current context of the underwater camera satisfies one or more second criteria associated with activation of one or more computational modes that are not currently activated on the underwater camera;

selecting one or more computational modes to be active based on (i) determining whether the current context of the underwater camera satisfies the one or more first criteria and (ii) determining whether the current context of the underwater camera satisfies the one or more second criteria; and causing the one or more computational modes to be active on the underwater camera, comprising:

activating any of the one or more computational modes that are to be active and that are not currently activated on the underwater camera, or deactivating any of the one or more computational modes that are currently activated on the underwater camera that are not included in the one or more computational modes that are to be activated, wherein the one or more computational modes comprises hardware computational modes and computational modes that require limited hardware, the hardware computational modes comprising sea lice detection, biomass detection, and feeding decision making, and the computational modes that require limited hardware comprising net inspection and recording decision making.

13. The system of claim 12, wherein obtaining the data indicative of the current context of the underwater camera further comprises:

obtaining data indicative of ambient light;
obtaining data indicative of power availability;
obtaining power availability of the underwater camera;
obtaining data indicative of connectivity between the underwater camera and a remote server;
obtaining data indicative of foreign fish presence in a fish pen that is proximate to a location of the underwater camera;
obtaining data indicative of opportunities for disease treatment of one or more fish being monitored;
obtaining data indicative of harvest schedules for harvesting the fish;
obtaining data indicative of research priorities;
obtaining data indicative of one or more of diseases and environmental factors of one or more other nearby fish farms;
obtaining data indicative of results of one or more other computational modes currently run on the underwater camera;
obtaining data indicative of fish distribution in the fish pen; and
obtaining data indicative of hardware status or maintenance associated with the underwater camera.

14. The system of claim 13, wherein determining whether the current context of the underwater camera satisfies the one or more first criteria associated with continued activation of the one or more computational modes that are currently activated on the underwater camera further comprises:

identifying the one or more first criteria associated with the one or more computational modes that are currently activated that defines whether the underwater camera should activate the one or more computational modes;

analyzing one or more of the data indicative of ambient light, the data indicative of power availability, the power availability of the underwater camera, the data indicative of connectivity, the data indicative of foreign fish presence, the data indicative of opportunities for disease treatment, the data indicative of harvest schedules, the data indicative of research priorities, the data indicative of one or more of diseases and environmental factors, the data indicative of results of one or more other computational modes, the data indicative of fish distribution in the fish pen, and the data indicative of hardware status or maintenance associated with the underwater camera, against the first criteria corresponding to each of the one or more computational modes currently active of the underwater camera;

in response to analyzing the data indicative of the current context of the underwater camera against the one or more first criteria of the currently active computational modes, determining a likelihood for each mode of the one or more computational modes that indicates whether the one or more computational modes should be active;

comparing the likelihood for each mode of the one or more computational modes to a threshold value; and in response to determining that a first subset of one or more computational modes that are currently active satisfies the threshold value, determining the first subset of the one or more computational modes are to continue being active; or in response to determining that a second subset of one or more computational modes that are currently active do not satisfy the threshold value, determining the second subset of the one or more computational modes are to be inactive.

15. The system of claim 14, wherein determining whether the current context of the underwater camera satisfies the one or more second criteria associated with activation of the one or more computational modes that are not currently activated on the underwater camera further comprises:

identifying the one or more second criteria associated with the one or more computational modes that are currently inactive that defines whether the underwater camera should activate the one or more computational modes;

analyzing one or more of the data indicative of ambient light, the data indicative of power availability, the power availability of the underwater camera, the data indicative of connectivity, the data indicative of foreign fish presence, the data indicative of opportunities for disease treatment, the data indicative of harvest schedules, the data indicative of research priorities, the data indicative of one or more of diseases and environmental factors, the data indicative of results of one or more other computational modes, the data indicative of fish distribution in the fish pen, and the data indicative of hardware status or maintenance associated with the underwater camera, against the second criteria corresponding to each of the one or more computational modes currently inactive of the underwater camera;

in response to analyzing the data indicative of the current context of the underwater camera against the one or more second criteria of the one or more computational modes currently inactive, determining a likelihood for each mode of the one or more computational modes that are currently inactive that indicates whether the one or more computational modes should be active;

comparing the likelihood for each mode of the one or more computational modes to a threshold value; and in response to determining that a third subset of one or more computational modes that are currently inactive satisfies the threshold value, determining the third subset of the one or more computational modes are to be active; or in response to determining that a fourth subset of one or more computational modes that are currently inactive do not satisfy the threshold value, determining the fourth subset of the one or more computational modes are to remain inactive.

16. The system of claim 15, wherein selecting the one or more computational modes to be active based on (i) determining whether the current context of the underwater camera satisfies the one or more first criteria and (ii) determining whether the current context of the underwater camera satisfies the one or more second criteria further comprises:

identifying the first subset of the one or more computational modes that are currently active to continue being active on the underwater camera; or identifying the second subset of the one or more computational modes that are currently active to transition to being inactive.

17. The system of claim 15, wherein selecting the one or more computational modes to be active based on (i) determining whether the current context of the underwater camera satisfies the one or more first criteria and (ii) determining whether the current context of the underwater camera satisfies the one or more second criteria further comprises:

identifying the third subset of the one or more computational modes that are currently inactive to transition to being active; or identifying the fourth subset of the one or more computational modes that are currently inactive to continue being inactive.

18. The system of claim 17, wherein activating any of the one or more computational modes that are to be active and that are not currently activated on the underwater camera further comprises:

activating the third subset of the one or more computational modes that are currently inactive on the underwater camera; and maintaining activation of the first subset of the one or more computational modes that are currently active on the underwater camera.

19. A non-transitory computer-readable medium storing software comprising instructions executable by one or more computers which, upon such execution, cause the one or more computers to perform operations comprising:

repeatedly, by a scheduler of an underwater camera:

obtaining data indicative of a current context of an underwater camera;

determining whether the current context of the underwater camera satisfies one or more first criteria associated with continued activation of one or more computational modes that are currently activated on the underwater camera, wherein the one or more computational modes each include a different set of one or more data processing operations;

determining whether the current context of the underwater camera satisfies one or more second criteria associated with activation of one or more computational modes that are not currently activated on the underwater camera;

selecting one or more computational modes to be active based on (i) determining whether the current context of the underwater camera satisfies the one or more first criteria and (ii) determining whether the current context of the underwater camera satisfies the one or more second criteria; and causing the one or more computational modes to be active on the underwater camera, comprising:

activating any of the one or more computational modes that are to be active and that are not currently activated on the underwater camera, or deactivating any of the one or more computational modes that are currently activated on the underwater camera that are not included in the one or more computational modes that are to be activated, wherein the one or more computational modes comprises hardware computational modes and computational modes that require limited hardware, the hardware computational modes comprising sea lice detection, biomass detection, and feeding decision making, and the computational modes that require limited hardware comprising net inspection and recording decision making.

* * * * *